(12) United States Patent
Tomioka

(10) Patent No.: US 9,568,715 B2
(45) Date of Patent: Feb. 14, 2017

(54) ZOOM LENS AND IMAGING APPARATUS

(71) Applicant: FUJIFILM Corporation, Tokyo (JP)

(72) Inventor: Ryoko Tomioka, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/855,436

(22) Filed: Sep. 16, 2015

(65) Prior Publication Data

US 2016/0004052 A1   Jan. 7, 2016

Related U.S. Application Data

(63) Continuation of application No. PCT/JP2013/007648, filed on Dec. 26, 2013.

(30) Foreign Application Priority Data

Mar. 22, 2013   (JP) .................................. 2013-059805

(51) Int. Cl.
*G02B 15/14*   (2006.01)
*G02B 9/60*   (2006.01)
(Continued)

(52) U.S. Cl.
CPC .............. *G02B 15/16* (2013.01); *G02B 13/006* (2013.01); *G02B 13/009* (2013.01);
(Continued)

(58) Field of Classification Search
CPC ... G02B 13/0045; G02B 27/0025; G02B 9/60; G02B 15/20; G02B 15/177; G02B 13/009; G02B 5/005; G02B 15/14; G02B 13/006; G02B 13/0065; G02B 17/08
(Continued)

(56) References Cited

U.S. PATENT DOCUMENTS 7,253,962 B2 *   8/2007   Sano .................. G02B 13/0065
                                                     359/676
7,312,931 B2 *  12/2007   Sano .................... G02B 15/173
                                                     359/683
(Continued)

FOREIGN PATENT DOCUMENTS

JP     2003-202500      7/2003
JP     2006-301543      11/2006
(Continued)

OTHER PUBLICATIONS

International Search Report PCT/JP2013/007648 dated Apr. 8, 2014.
(Continued)

*Primary Examiner* — Evelyn A Lester
(74) *Attorney, Agent, or Firm* — Young & Thompson

(57) ABSTRACT

A zoom lens consists of, in order from the object-side, a first lens-group having positive refractive power, and which is fixed during magnification change, a second lens-group having negative refractive power, and which moves during magnification change, a third lens-group having positive refractive power, and which is fixed during magnification change, a fourth lens-group having positive refractive power, and which moves during magnification change, and a fifth lens-group having negative refractive power, and which moves during magnification change. The first lens-group consists of, in order from the object-side, a front group having negative refractive power, a reflection member that bends an optical path and a rear group having positive refractive power. The fourth lens-group includes at least a cemented lens of a positive lens and a negative lens, and the following conditional expression (1) is satisfied:

$0.8 < IH/fw$   (1).

14 Claims, 13 Drawing Sheets

(51) Int. Cl.
  *G02B 15/16* (2006.01)
  *G02B 15/173* (2006.01)
  *G02B 15/20* (2006.01)
  *G02B 13/00* (2006.01)
  *G02B 27/00* (2006.01)
  *G02B 17/08* (2006.01)
  *G02B 5/00* (2006.01)
  *G02B 15/177* (2006.01)

(52) U.S. Cl.
  CPC ............ *G02B 15/173* (2013.01); *G02B 5/005* (2013.01); *G02B 9/60* (2013.01); *G02B 13/0045* (2013.01); *G02B 13/0065* (2013.01); *G02B 15/14* (2013.01); *G02B 15/177* (2013.01); *G02B 15/20* (2013.01); *G02B 17/08* (2013.01); *G02B 27/0025* (2013.01)

(58) Field of Classification Search
  USPC ........ 359/676, 683–687, 714, 726, 740, 764
  See application file for complete search history.

(56) References Cited

U.S. PATENT DOCUMENTS

| | | | | |
|---|---|---|---|---|
| 7,643,223 | B2* | 1/2010 | Shirota | G02B 13/16 359/683 |
| 7,864,443 | B2* | 1/2011 | Sudoh | G02B 15/173 359/676 |
| 8,405,914 | B2* | 3/2013 | Yamashita | G02B 15/173 359/676 |
| 8,559,117 | B2* | 10/2013 | Arai | G02B 15/173 359/678 |
| 2003/0161620 | A1 | 8/2003 | Hagimori et al. | |
| 2006/0056048 | A1* | 3/2006 | Sato | G02B 13/0065 359/684 |
| 2006/0066955 | A1* | 3/2006 | Satori | G02B 15/173 359/687 |
| 2006/0238886 | A1 | 10/2006 | Kushida et al. | |
| 2007/0070513 | A1* | 3/2007 | Yamashita | G02B 15/173 359/676 |
| 2008/0094709 | A1* | 4/2008 | Iwasawa | G02B 27/646 359/557 |
| 2008/0239506 | A1* | 10/2008 | Ori | G02B 15/173 359/676 |
| 2009/0208195 | A1* | 8/2009 | Hatakeyama | G02B 15/173 359/684 |
| 2009/0231725 | A1 | 9/2009 | Matsunaga et al. | |
| 2010/0128361 | A1* | 5/2010 | Shirota | G02B 15/173 359/684 |
| 2010/0182704 | A1 | 7/2010 | Yamashita | |
| 2011/0085247 | A1* | 4/2011 | Matsumura | G02B 13/18 359/683 |
| 2011/0085249 | A1* | 4/2011 | Seo | G02B 13/18 359/684 |
| 2012/0038795 | A1* | 2/2012 | Katayose | G02B 15/173 348/240.1 |
| 2012/0075494 | A1* | 3/2012 | Katayose | G02B 15/173 348/222.1 |
| 2012/0154524 | A1* | 6/2012 | Matsumura | G02B 15/173 348/36 |
| 2013/0021674 | A1* | 1/2013 | Fujikura | G02B 15/173 359/683 |
| 2013/0258162 | A1* | 10/2013 | Tomioka | G02B 15/173 348/340 |

FOREIGN PATENT DOCUMENTS

| | | |
|---|---|---|
| JP | 2009-042700 | 2/2009 |
| JP | 2009-222891 | 10/2009 |
| JP | 2010-186141 | 8/2010 |
| JP | 2010191413 | 9/2010 |
| JP | 2011-017772 | 1/2011 |
| JP | 2011-017773 | 1/2011 |
| JP | 2011141328 | 7/2011 |
| JP | 2013-044757 | 3/2013 |

OTHER PUBLICATIONS

International Search Opinion PCT/ISA/237 with partial English translation PCT/JP2013/007648 dated Apr. 8, 2014.

* cited by examiner

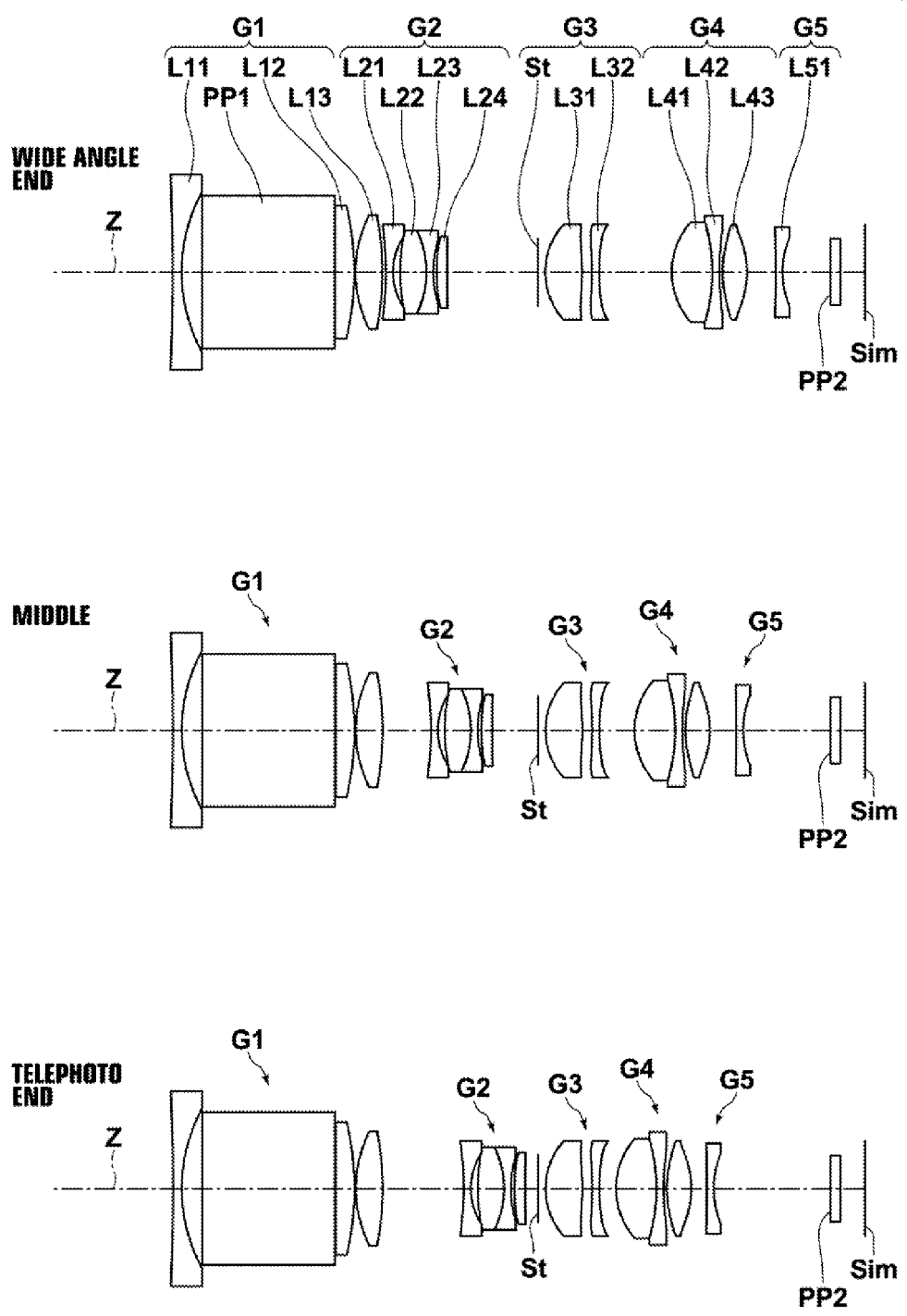

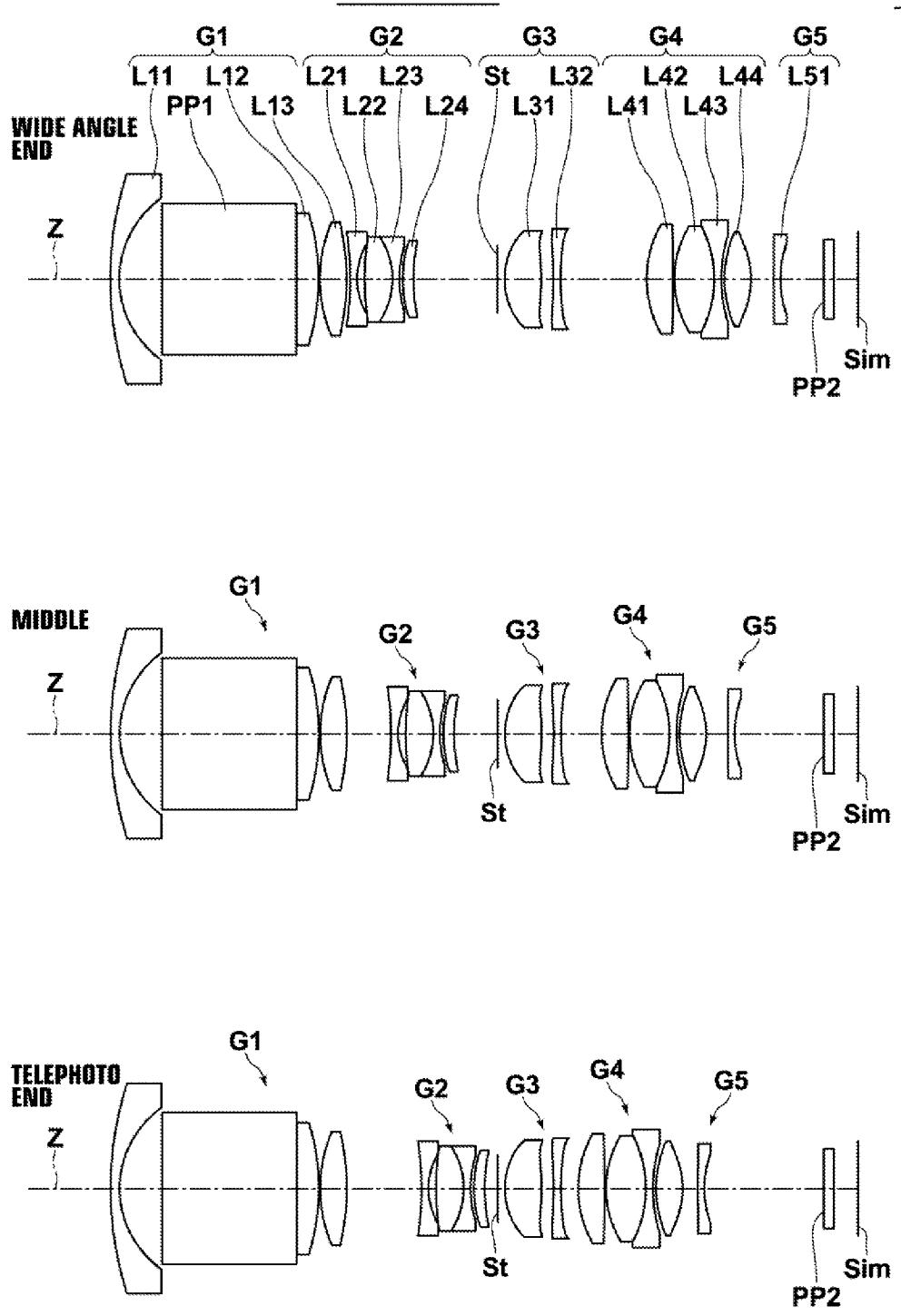

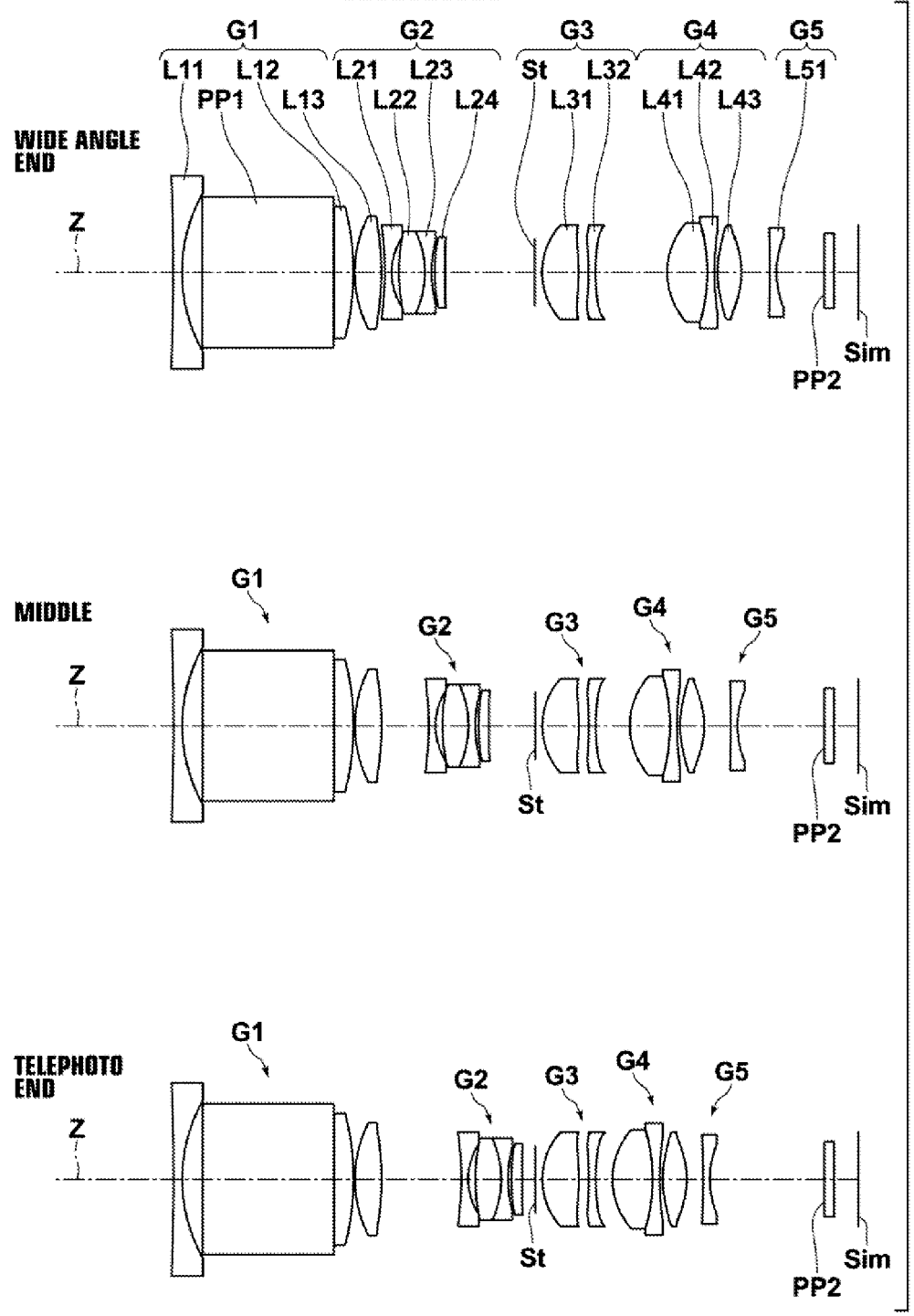

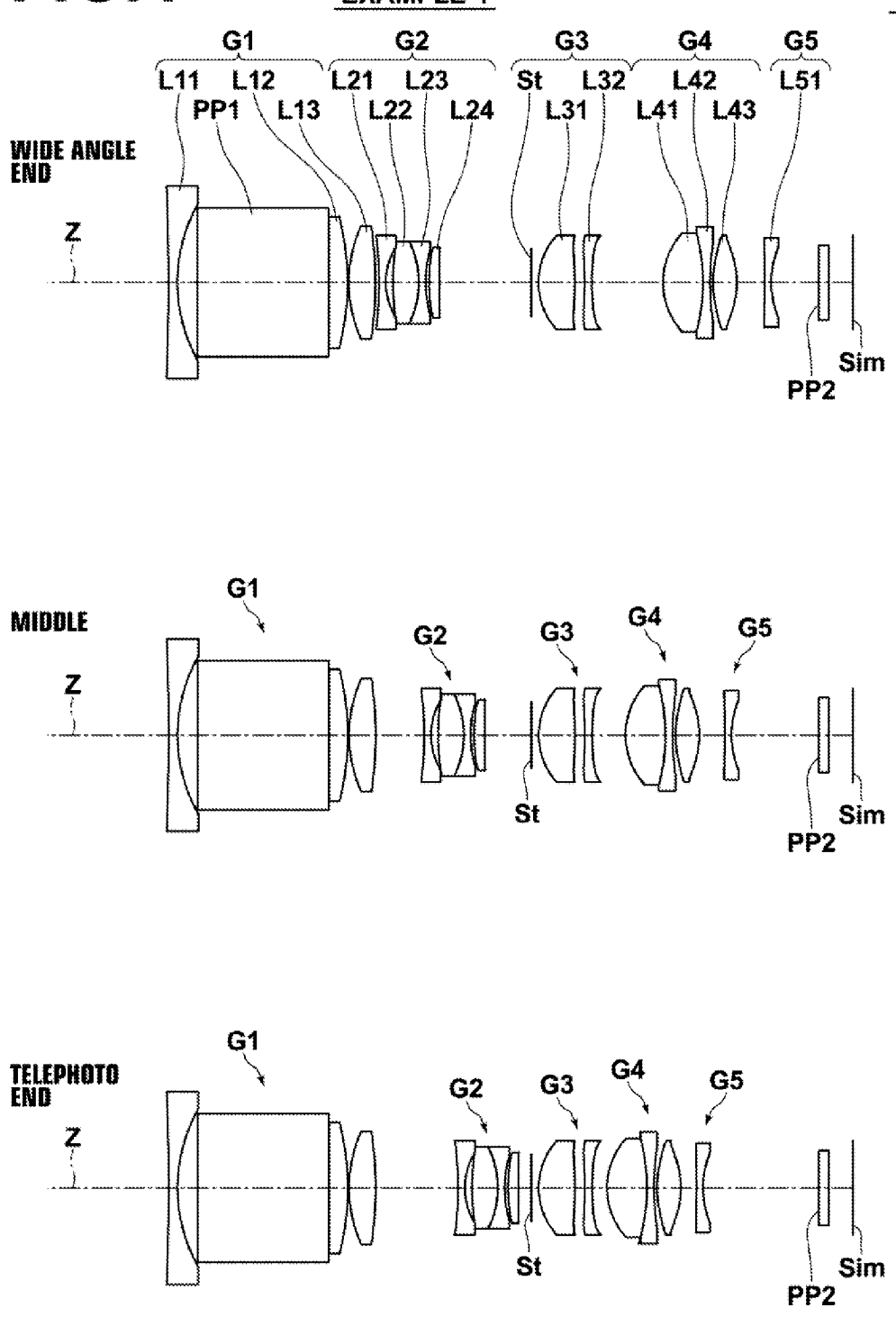

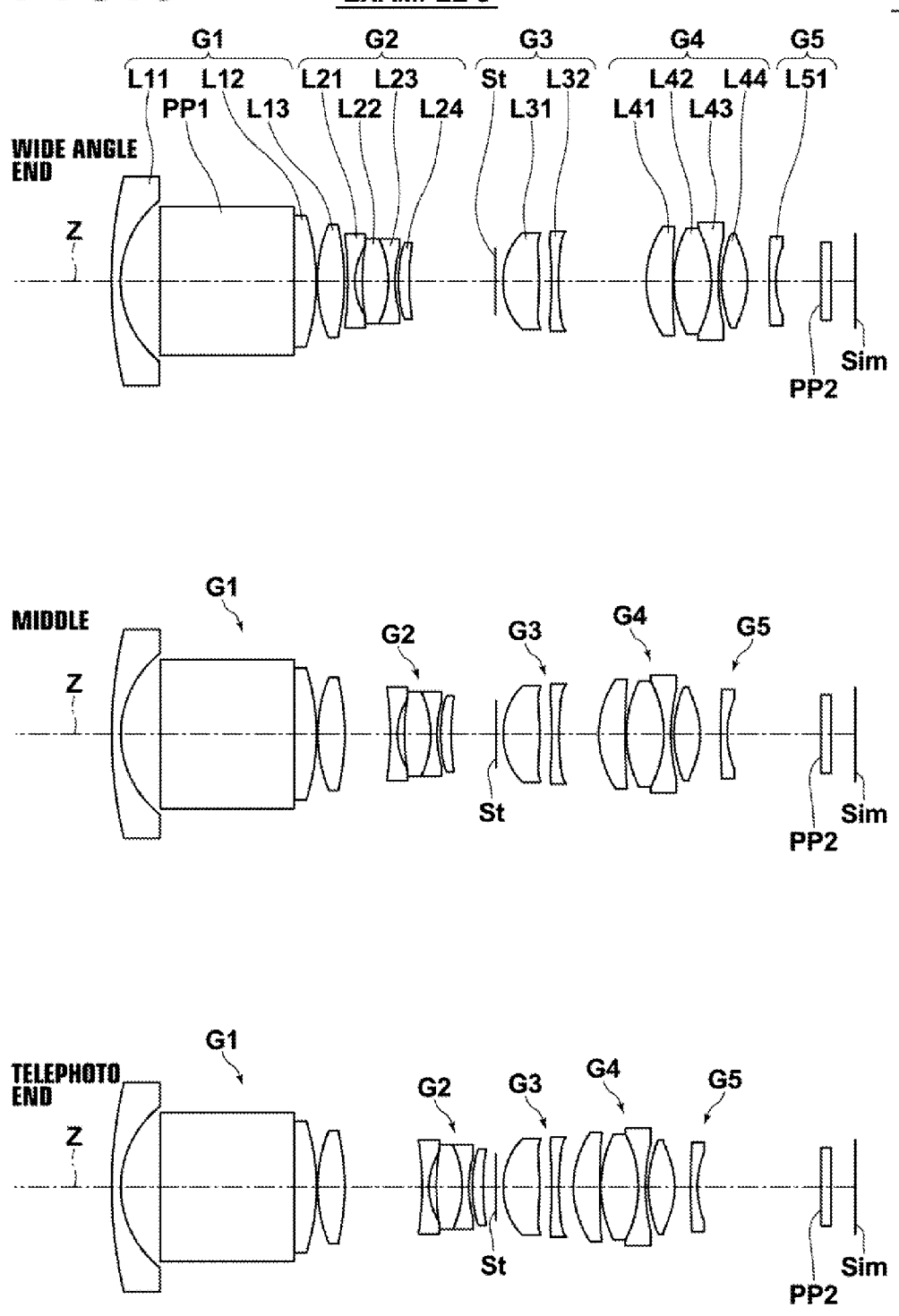

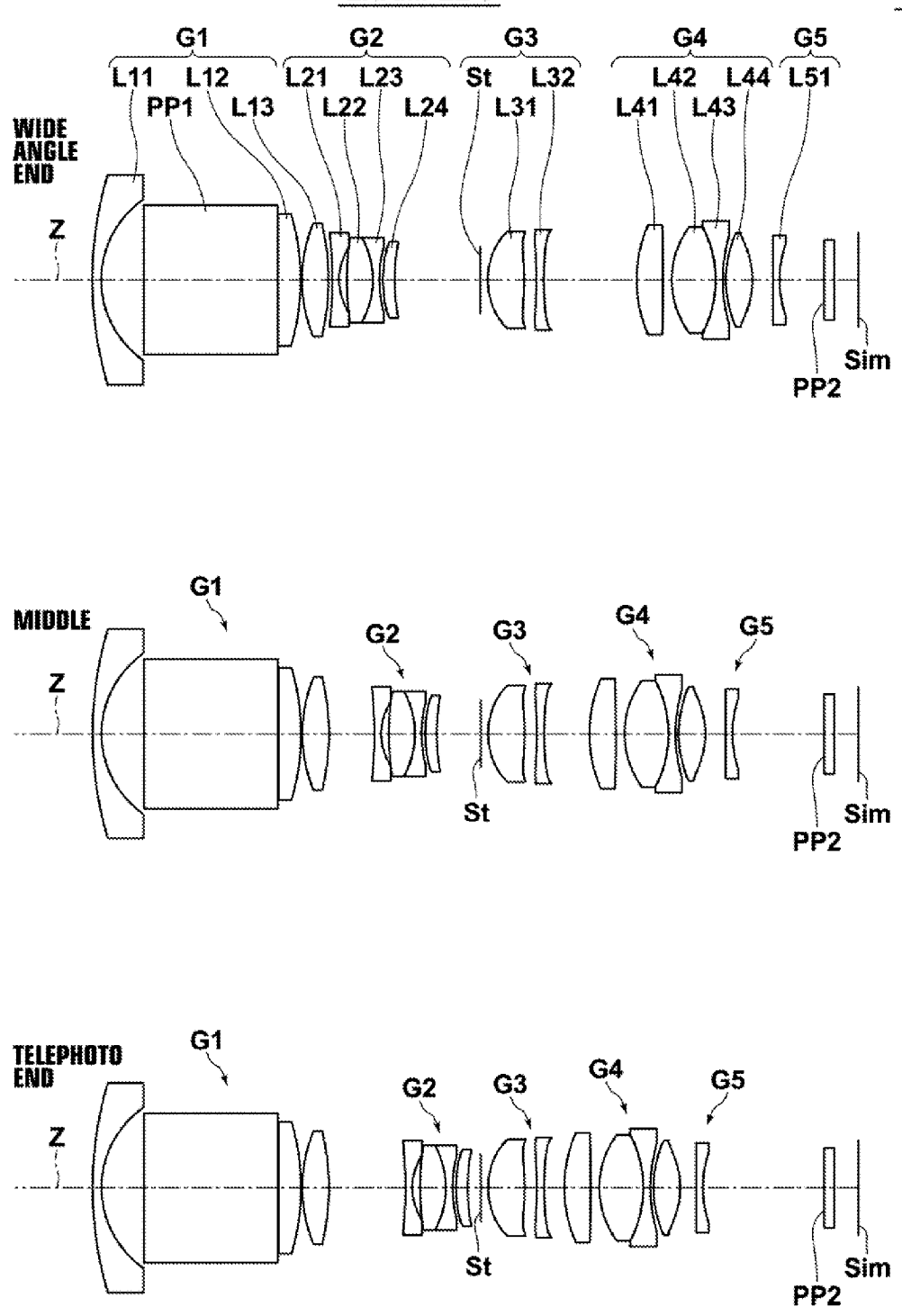

FIG.7

EXAMPLE 1

WIDE ANGLE END

FNo. = 2.87 — 587.6nm, --- 460.0nm, ---- 615.0nm
-0.2 0.2
SPHERICAL ABERRATION
A

ω = 45.4° — SAGITTAL, ···· TANGENTIAL
-0.2 0.2
ASTIGMATISM
B

ω = 45.4°
-10% 10%
DISTORTION
C

ω = 45.4°
-20 μm 20 μm
LATERAL CHROMATIC ABERRATION
D

MIDDLE

FNo. = 3.51 — 587.6nm, --- 460.0nm, ---- 615.0nm
-0.2 0.2
SPHERICAL ABERRATION
E

ω = 19.6° — SAGITTAL, ···· TANGENTIAL
-0.2 0.2
ASTIGMATISM
F

ω = 19.6°
-10% 10%
DISTORTION
G

ω = 19.6°
-20 μm 20 μm
LATERAL CHROMATIC ABERRATION
H

TELEPHOTO END

FNo. = 4.46 — 587.6nm, --- 460.0nm, ---- 615.0nm
-0.2 0.2
SPHERICAL ABERRATION
I

ω = 9.7° — SAGITTAL, ···· TANGENTIAL
-0.2 0.2
ASTIGMATISM
J

ω = 9.7°
-10% 10%
DISTORTION
K

ω = 9.7°
-20 μm 20 μm
LATERAL CHROMATIC ABERRATION
L

FIG.8

EXAMPLE 2

WIDE ANGLE END

FNo. = 2.87 | ω = 50.3° | ω = 50.3° | ω = 50.3°

— 587.6nm
--- 460.0nm
---- 615.0nm

— SAGITTAL
······ TANGENTIAL

-0.2  0.2 | -0.2  0.2 | -10%  10% | -20μm  20μm
SPHERICAL ABERRATION | ASTIGMATISM | DISTORTION | LATERAL CHROMATIC ABERRATION
A | B | C | D

MIDDLE

FNo. = 3.56 | ω = 23.1° | ω = 23.1° | ω = 23.1°

— 587.6nm
--- 460.0nm
---- 615.0nm

— SAGITTAL
······ TANGENTIAL

-0.2  0.2 | -0.2  0.2 | -10%  10% | -20μm  20μm
SPHERICAL ABERRATION | ASTIGMATISM | DISTORTION | LATERAL CHROMATIC ABERRATION
E | F | G | H

TELEPHOTO END

FNo. = 4.82 | ω = 11.5° | ω = 11.5° | ω = 11.5°

— 587.6nm
--- 460.0nm
---- 615.0nm

— SAGITTAL
······ TANGENTIAL

-0.2  0.2 | -0.2  0.2 | -10%  10% | -20μm  20μm
SPHERICAL ABERRATION | ASTIGMATISM | DISTORTION | LATERAL CHROMATIC ABERRATION
I | J | K | L

FIG.9

EXAMPLE 3

WIDE ANGLE END

FNo. = 2.89 — 587.6nm, -·- 460.0nm, ---- 615.0nm
-0.2 to 0.2 SPHERICAL ABERRATION
A

ω = 45.6° — SAGITTAL, ······ TANGENTIAL
-0.2 to 0.2 ASTIGMATISM
B

ω = 45.6°
-10% to 10% DISTORTION
C

ω = 45.6°
-20μm to 20μm LATERAL CHROMATIC ABERRATION
D

MIDDLE

FNo. = 3.53 — 587.6nm, -·- 460.0nm, ---- 615.0nm
-0.2 to 0.2 SPHERICAL ABERRATION
E

ω = 19.6° — SAGITTAL, ······ TANGENTIAL
-0.2 to 0.2 ASTIGMATISM
F

ω = 19.6°
-10% to 10% DISTORTION
G

ω = 19.6°
-20μm to 20μm LATERAL CHROMATIC ABERRATION
H

TELEPHOTO END

FNo. = 4.46 — 587.6nm, -·- 460.0nm, ---- 615.0nm
-0.2 to 0.2 SPHERICAL ABERRATION
I

ω = 9.7° — SAGITTAL, ······ TANGENTIAL
-0.2 to 0.2 ASTIGMATISM
J

ω = 9.7°
-10% to 10% DISTORTION
K

ω = 9.7°
-20μm to 20μm LATERAL CHROMATIC ABERRATION
L

FIG.10

EXAMPLE 4

WIDE ANGLE END

A SPHERICAL ABERRATION
FNo. = 2.88
—— 587.6nm
—·— 460.0nm
—··— 615.0nm
-0.2 to 0.2

B ASTIGMATISM
$\omega$ = 45.8°
—— SAGITTAL
······ TANGENTIAL
-0.2 to 0.2

C DISTORTION
$\omega$ = 45.8°
-10% to 10%

D LATERAL CHROMATIC ABERRATION
$\omega$ = 45.8°
-20μm to 20μm

MIDDLE

E SPHERICAL ABERRATION
FNo. = 3.53
—— 587.6nm
—·— 460.0nm
—··— 615.0nm
-0.2 to 0.2

F ASTIGMATISM
$\omega$ = 19.7°
—— SAGITTAL
······ TANGENTIAL
-0.2 to 0.2

G DISTORTION
$\omega$ = 19.7°
-10% to 10%

H LATERAL CHROMATIC ABERRATION
$\omega$ = 19.7°
-20μm to 20μm

TELEPHOTO END

I SPHERICAL ABERRATION
FNo. = 4.77
—— 587.6nm
—·— 460.0nm
—··— 615.0nm
-0.2 to 0.2

J ASTIGMATISM
$\omega$ = 9.7°
—— SAGITTAL
······ TANGENTIAL
-0.2 to 0.2

K DISTORTION
$\omega$ = 9.7°
-10% to 10%

L LATERAL CHROMATIC ABERRATION
$\omega$ = 9.7°
-20μm to 20μm

FIG.11

EXAMPLE 5

WIDE ANGLE END

A — Spherical Aberration — FNo. = 2.90; 587.6nm, 460.0nm, 615.0nm; -0.2 to 0.2

B — Astigmatism — ω = 50.8°; Sagittal, Tangential; -0.2 to 0.2

C — Distortion — ω = 50.8°; -10% to 10%

D — Lateral Chromatic Aberration — ω = 50.8°; -20μm to 20μm

MIDDLE

E — Spherical Aberration — FNo. = 3.61; 587.6nm, 460.0nm, 615.0nm; -0.2 to 0.2

F — Astigmatism — ω = 23.1°; Sagittal, Tangential; -0.2 to 0.2

G — Distortion — ω = 23.1°; -10% to 10%

H — Lateral Chromatic Aberration — ω = 23.1°; -20μm to 20μm

TELEPHOTO END

I — Spherical Aberration — FNo. = 4.80; 587.6nm, 460.0nm, 615.0nm; -0.2 to 0.2

J — Astigmatism — ω = 11.5°; Sagittal, Tangential; -0.2 to 0.2

K — Distortion — ω = 11.5°; -10% to 10%

L — Lateral Chromatic Aberration — ω = 11.5°; -20μm to 20μm

FIG.12
EXAMPLE 6

WIDE ANGLE END

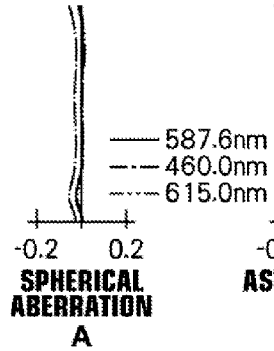
FNo. = 2.91
— 587.6nm
--- 460.0nm
---- 615.0nm
-0.2  0.2
SPHERICAL ABERRATION
A

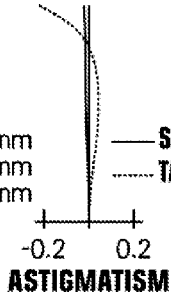
ω = 49.1°
— SAGITTAL
···· TANGENTIAL
-0.2  0.2
ASTIGMATISM
B

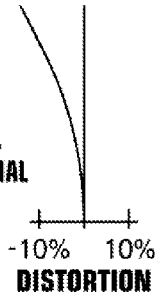
ω = 49.1°
-10%  10%
DISTORTION
C

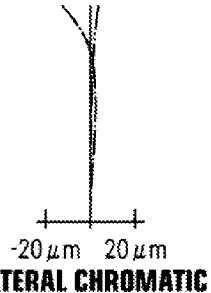
ω = 49.1°
-20μm  20μm
LATERAL CHROMATIC ABERRATION
D

MIDDLE

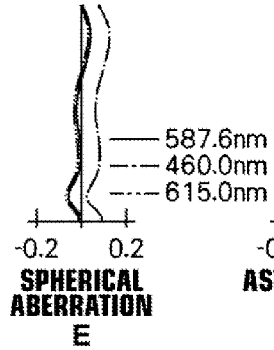
FNo. = 3.59
— 587.6nm
--- 460.0nm
---- 615.0nm
-0.2  0.2
SPHERICAL ABERRATION
E

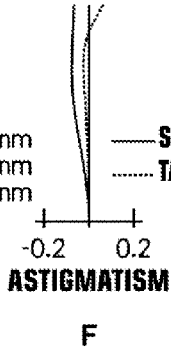
ω = 22.8°
— SAGITTAL
···· TANGENTIAL
-0.2  0.2
ASTIGMATISM
F

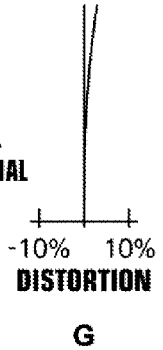
ω = 22.8°
-10%  10%
DISTORTION
G

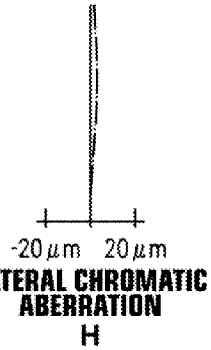
ω = 22.8°
-20μm  20μm
LATERAL CHROMATIC ABERRATION
H

TELEPHOTO END

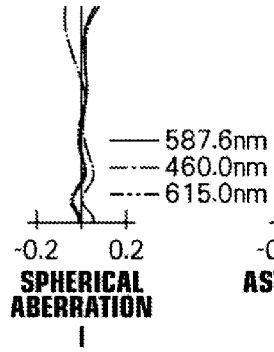
FNo. = 4.78
— 587.6nm
--- 460.0nm
---- 615.0nm
-0.2  0.2
SPHERICAL ABERRATION
I

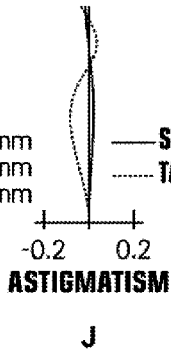
ω = 11.4°
— SAGITTAL
···· TANGENTIAL
-0.2  0.2
ASTIGMATISM
J

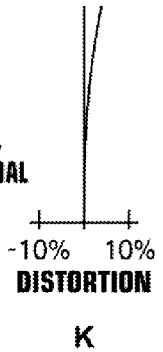
ω = 11.4°
-10%  10%
DISTORTION
K

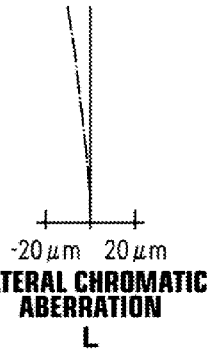
ω = 11.4°
-20μm  20μm
LATERAL CHROMATIC ABERRATION
L

ZOOM LENS AND IMAGING APPARATUS

CROSS-REFERENCE TO RELATED APPLICATIONS

This application is a Continuation of PCT International Application No. PCT/JP2013/007648 filed on Dec. 26, 2013, which claims priority under 35 U.S.C. §119(a) to Japanese Patent Application No. 2013-059805 filed on Mar. 22, 2013. Each of the above applications is hereby expressly incorporated by reference, in its entirety, into the present application.

BACKGROUND

The present disclosure relates to a zoom lens appropriate for an electronic camera, such as a digital camera and a video camera, and an imaging apparatus including the zoom lens. Digital cameras that can input image information about landscapes, portraits and the like obtained by photography to personal computers became widely used in recent years.

In such digital cameras, a demand for reduction in the thickness of a zoom lens in addition to a high magnification zoom lens has been increasing. Therefore, a zoom lens including a reflection member in its optical path, and the thickness of which has been reduced by bending the optical path, has been proposed.

As such zoom lenses in which reflection members are provided in optical paths, there are zoom lenses disclosed in Japanese Unexamined Patent Publication No. 2003-202500 (Patent Document 1), Japanese Unexamined Patent Publication No. 2009-222891 (Patent Document 2), Japanese Unexamined Patent Publication No. 2009-042700 (Patent Document 3), Japanese Unexamined Patent Publication No. 2006-301543 (Patent Document 4), and Japanese Unexamined Patent Publication No. 2010-191413 (Patent Document 5).

SUMMARY

Recently, a demand for a zoom lens having a wider angle of view, and which is a faster lens, while having a high magnification ratio and a small size is increasing.

The zoom lens disclosed in Patent Document 1 has a zoom ratio of about 5.8 times, which is a high magnification ratio, and an F-number of about 2.9 at a wide angle end, which means a fast lens. However, the zoom lens has an angle of view of about 60 degrees at a wide angle end, which is not recognizable as a wide angle.

The zoom lens disclosed in Patent Document 2 has an F-number of about 2.5 at a wide angle end. Therefore, the zoom lens is a fast photography lens, but an angle of view at a wide angle end is about 70 degrees.

The zoom lens disclosed in Patent Document 3 has an angle of view exceeding 85 degrees at a wide angle end. Therefore, the zoom lens has a wide angle of view. However, an F-number at a wide angle end is about 4.0, which is not recognizable as a fast lens.

Further, the zoom lenses disclosed in Patent Documents 4 and 5 have zoom ratios of about 3 times, which are low. Further, angles of view at a wide angle end are about 60 degrees, which are not recognizable as wide angles.

In view of the foregoing circumstances, the present disclosure provides a zoom lens having a high zoom ratio and a wide angle of view, and which is a fast lens, and in which various aberrations are excellently corrected, and an imaging apparatus including the lens.

A zoom lens of the present disclosure consists of, in order from the object side, a first lens group having positive refractive power, and which is fixed during magnification change, a second lens group having negative refractive power, and which moves during magnification change, a third lens group having positive refractive power, and which is fixed during magnification change, a fourth lens group having positive refractive power, and which moves during magnification change, and a fifth lens group having negative refractive power, and which moves during magnification change. The first lens group consists of, in order from the object side, a front group having negative refractive power, a reflection member that bends an optical path and a rear group having positive refractive power. The fourth lens group includes at least a cemented lens of a positive lens and a negative lens. Further, the following conditional expression (1) is satisfied:

$$0.8 < IH/fw \quad (1),\text{ where}$$

IH is a maximum image height, and fw is a focal length at a wide angle end.

In the zoom lens of the present disclosure, it is desirable that the third lens group includes a stop, and the following conditional expression (2) is satisfied:

$$0.18 < \phi stw/Dstim < 0.25 \quad (2),\text{ where}$$

$\phi stw$ is an aperture stop diameter at a wide angle end, and Dstim is a distance from a stop to an image plane (a back focus is an air equivalent length).

Further, it is desirable that the following conditional expression (3) is satisfied:

$$vd4p > 75.0 \quad (3),\text{ where}$$

vd4p is an Abbe number of the positive lens constituting the cemented lens in the fourth lens group.

Further, it is desirable that the following conditional expression (4) is satisfied:

$$1.5 < f4/fw < 3.0 \quad (4),\text{ where}$$

f4 is a focal length of the fourth lens group.

Further, it is desirable that the following conditional expression (5-1) is satisfied:

$$vd4p - vd4n > 45 \quad (5),\text{ where}$$

vd4p is an Abbe number of the positive lens constituting the cemented lens in the fourth lens group, and vd4n is an Abbe number of the negative lens constituting the cemented lens in the fourth lens group.

It is desirable that the second lens group includes, in order from the object side, a negative lens, a positive lens and a negative lens, and consists of four lenses as a whole.

Further, it is desirable that the third lens group includes, in order from the object side, a positive lens and a negative lens.

Further, it is desirable that the following conditional expression (6) is satisfied:

$$\phi stt/\phi stw < 1 \quad (6),\text{ where}$$

$\phi stt$ is an aperture stop diameter at a telephoto end, and $\phi stw$ is an aperture stop diameter at a wide angle end.

Further, it is desirable that the following conditional expression (1-1) is satisfied. It is more desirable that the following conditional expression (1-2) is satisfied:

$$0.8 < IH/fw < 1.1 \quad (1\text{-}1);\text{ and}$$

$$0.9 < IH/fw < 1.1 \quad (1\text{-}2).$$

Further, it is desirable that the third lens group includes a stop, and the following conditional expression (2-1) is satisfied:

$$0.18 < \phi stw/Dstim < 0.23 \quad (2\text{-}1).$$

Further, it is desirable that the following conditional expression (3-1) is satisfied:

$$vd4p > 80.0 \quad (3\text{-}1).$$

Further, it is desirable that the following conditional expression (4-1) is satisfied:

$$1.7 < f4/fw < 2.5 \quad (4\text{-}1).$$

Further, it is desirable that the following conditional expression (5-1) is satisfied:

$$vd4p - vd4n > 50 \quad (5\text{-}1).$$

An imaging apparatus of the present disclosure includes the zoom lens of the present disclosure.

The zoom lens of the present disclosure consists of, in order from the object side, a first lens group having positive refractive power, and which is fixed during magnification change, a second lens group having negative refractive power, and which moves during magnification change, a third lens group having positive refractive power, and which is fixed during magnification change, a fourth lens group having positive refractive power, and which moves during magnification change, and a fifth lens group having negative refractive power, and which moves during magnification change. The first lens group consists of, in order from the object side, a front group having negative refractive power, a reflection member that bends an optical path and a rear group having positive refractive power. The fourth lens group includes at least a cemented lens of a positive lens and a negative lens. Further, the following conditional expression (1) is satisfied. Therefore, it is possible to provide a zoom lens having a high zoom ratio and a wide angle of view, and which is a fast lens, and in which various aberrations are excellently corrected, and an imaging apparatus including the lens.

$$0.8 < IH/fw \quad (1).$$

Further, the imaging apparatus of the present disclosure includes the zoom lens of the present disclosure. Therefore, it is possible to increase the zoom ratio and to obtain video images with high image qualities.

BRIEF DESCRIPTION OF THE DRAWINGS

FIG. 1 is a cross section illustrating the lens configuration of a zoom lens according to an embodiment of the present disclosure (also Example 1);

FIG. 2 is a cross section illustrating the lens configuration of a zoom lens in Example 2 of the present disclosure;

FIG. 3 is a cross section illustrating the lens configuration of a zoom lens in Example 3 of the present disclosure;

FIG. 4 is a cross section illustrating the lens configuration of a zoom lens in Example 4 of the present disclosure;

FIG. 5 is a cross section illustrating the lens configuration of a zoom lens in Example 5 of the present disclosure;

FIG. 6 is a cross section illustrating the lens configuration of a zoom lens in Example 6 of the present disclosure;

FIG. 7 is aberration diagrams of the zoom lens in Example 1 of the present disclosure (Sections A through L);

FIG. 8 is aberration diagrams of the zoom lens in Example 2 of the present disclosure (Sections A through L);

FIG. 9 is aberration diagrams of the zoom lens in Example 3 of the present disclosure (Sections A through L);

FIG. 10 is aberration diagrams of the zoom lens in Example 4 of the present disclosure (Sections A through L);

FIG. 11 is aberration diagrams of the zoom lens in Example 5 of the present disclosure (Sections A through L);

FIG. 12 is aberration diagrams of the zoom lens in Example 6 of the present disclosure (Sections A through L);

DESCRIPTION OF THE PREFERRED EMBODIMENTS

Figure 13:
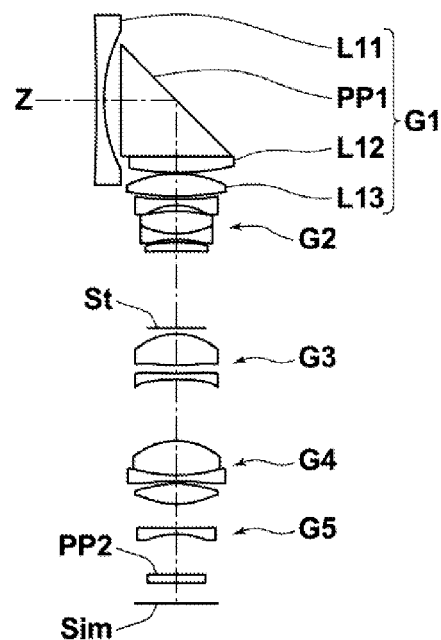
FIG. 13 is a cross section illustrating an actual state of the zoom lens of the present disclosure.

Next, embodiments of the present disclosure will be described in detail with reference to drawings. FIG. 1 is a cross section illustrating the lens configuration of a zoom lens according to an embodiment of the present disclosure. FIG. 13 is a cross section illustrating an actual state of the zoom lens of the present disclosure. The example of configuration illustrated in FIG. 1 is also the configuration of a zoom lens in Example 1, which will be described later. In FIG. 1, a left side is an object side, and a right side is an image side. For convenience, optical axis Z is illustrated as a straight line. However, an actual optical axis is bent by a reflection member, as illustrated in FIG. 13.

As illustrated in FIG. 1, this zoom lens consists of, in order from the object side along optical axis Z, first lens group G1 having positive refractive power, and which is fixed during magnification change, second lens group G2 having negative refractive power, and which moves during magnification change, third lens group G3 that includes aperture stop St and has positive refractive power, and which is fixed during magnification change, fourth lens group G4 having positive refractive power, and which moves during magnification change, and fifth lens group G5 having negative refractive power, and which moves during magnification change. Here, aperture stop St does not necessarily represent the size nor the shape of the aperture stop, but the position of the aperture stop on optical axis Z.

When this zoom lens is applied to an imaging apparatus, it is desirable to arrange a cover glass, a prism, and various filters, such as an infrared-ray-cut filter and a low-pass filter, between an optical system and image plane Sim based on the configuration of a camera on which the lens is mounted. Therefore, FIG. 1 illustrates an example in which parallel-flat-plate-shaped optical member PP2, which is assumed to be such elements, is arranged between the lens system and image plane Sim.

First lens group G1 consists of, in order from the object side, a front group having negative refractive power (negative lens L11), reflection member PP1 that bends an optical path and a rear group having positive refractive power (positive lens L12 and positive lens L13).

Fourth lens group G4 includes at least a cemented lens of positive lens L41 and negative lens L42.

Magnification is changed by moving three groups of second lens group G2, fourth lens group G4 and fifth lens group G5 as described above. Therefore, the configuration is advantageous to increasing magnification without increasing the total length.

Further, since fourth lens group G4 includes a cemented lens, it is possible to excellently correct chromatic aberrations even if an angle of view is widened.

Further, the following conditional expression (1) is satisfied. Here, when the following conditional expression (1-1)

is satisfied, and more desirably, when the following conditional expression (1-2) is satisfied, more excellent characteristics are achievable.

This conditional expression (1) is an expression about an angle of view at a wide angle end. When the value is not lower than the lower limit of conditional expression (1), excellent optical performance is achievable even if the angle of view is increased. When the value does not exceed the upper limit of conditional expression (1-1) or (1-2), it is possible to prevent the size of first lens group G1 from becoming too large. Therefore, it is possible to reduce the size of the zoom lens in its thickness direction when an optical path is bent by reflection member PP1.

$$0.8 < IH/fw \qquad (1);$$

$$0.8 < IH/fw < 1.1 \qquad (1\text{-}1); \text{ or}$$

$$0.9 < IH/fw < 1.1 \qquad (1\text{-}2), \text{ where}$$

IH is a maximum image height, and fw is a focal length at a wide angle end.

In the zoom lens of the embodiment of the present disclosure, it is desirable that aperture stop St is included in third lens group G3, and that the following conditional expression (2) is satisfied. This conditional expression (2) is an expression about the diameter of rays entering third lens group G3. When the value is not lower than the lower limit of conditional expression (2), it is possible to make the optical system a fast optical system. When the value does not exceed the upper limit of conditional expression (2), it is possible to suppress the diameter of rays entering third lens group G3. Therefore, a spherical aberration is easily corrected. When the following conditional expression (2-1) is satisfied, more excellent characteristics are achievable.

$$0.18 < \phi stw/Dstim < 0.25 \qquad (2); \text{ or}$$

$$0.18 < \phi stw/Dstim < 0.23 \qquad (2\text{-}1), \text{ where}$$

$\phi stw$ is an aperture stop diameter at a wide angle end, and Dstim is a distance from a stop to an image plane (a back focus is an air equivalent length).

It is desirable that the following conditional expression (3) is satisfied. This conditional expression (3) is an expression about the Abbe number of the positive lens constituting the cemented lens in fourth lens group G4. When the conditional expression (3) is satisfied, it is possible to excellently correct chromatic aberrations even if the angle of view is widened. When the following conditional expression (3-1) is satisfied, more excellent characteristics are achievable.

$$vd4p > 75.0 \qquad (3); \text{ or}$$

$$vd4p > 80.0 \qquad (3\text{-}1), \text{ where}$$

vd4p is the Abbe number of the positive lens constituting the cemented lens in the fourth lens group.

It is desirable that the following conditional expression (4) is satisfied. This conditional expression (4) is an expression about the focal length of fourth lens group G4. When the value is not lower than the lower limit of conditional expression (4), it is possible to prevent the refractive power of fourth lens group G4 from becoming too strong. Therefore, it is possible to reduce aberrations. Further, when the value does not exceed the upper limit of conditional expression (4), it is possible to prevent the refractive power of fourth lens group G4 from becoming too weak. Therefore, it is possible to suppress a movement amount during magnification change, and to prevent the total length from becoming long. When the following conditional expression (4-1) is satisfied, more excellent characteristics are achievable.

$$1.5 < f4/fw < 3.0 \qquad (4); \text{ or}$$

$$1.7 < f4/fw < 2.5 \qquad (4\text{-}1), \text{ where}$$

f4 is a focal length of the fourth lens group, and fw is a focal length at a wide angle end.

It is desirable that the following conditional expression (5) is satisfied. Conditional expression (5) is an expression about the material of the cemented lens in fourth lens group G4. When conditional expression (5) is satisfied, more excellent correction of chromatic aberrations is possible. When the following conditional expression (5-1) is satisfied, more excellent characteristics are achievable.

$$vd4p - vd4n > 45 \qquad (5); \text{ or}$$

$$vd4p - vd4n > 50 \qquad (5\text{-}1), \text{ where}$$

vd4p is the Abbe number of the positive lens constituting the cemented lens in the fourth lens group, and vd4n is the Abbe number of the negative lens constituting the cemented lens in the fourth lens group.

It is desirable that second lens group G2 includes, in order from the object side, negative lens L21, positive lens L22 and negative lens L23, and consists of four lenses as a whole. Accordingly, it is possible to reduce a fluctuation of aberrations during magnification change, and to make the zoom lens advantageous also to correction of chromatic aberrations.

It is desirable that third lens group G3 includes, in order from the object side, positive lens L31 and negative lens L32. Accordingly, it is possible to provide a zoom lens in which aberrations are excellently corrected without increasing the total length of the zoom lens.

It is desirable that the following conditional expression (6) is satisfied. This conditional expression (6) is an expression about an aperture stop diameter of the zoom lens. When an aperture stop diameter at the telephoto end satisfies conditional expression (6), it is possible to reduce the outer diameter of second lens group G2. Therefore, it is possible to reduce the size of the zoom lens in its thickness direction when an optical path is bent by reflection member PP1.

$$\phi stt/\phi stw < 1 \qquad (6), \text{ where}$$

$\phi stt$ is an aperture stop diameter at a telephoto end, and $\phi stw$ is an aperture stop diameter at a wide angle end.

In the zoom lens of the present disclosure, specifically, it is desirable to use glass, as a material arranged closest to the object side. Alternatively, transparent ceramic may be used.

When the zoom lens of the present disclosure is used in tough conditions, it is desirable that a multi-layer coating for protection is applied to the zoom lens. Further, an anti-reflection coating for reducing ghost light during use or the like may be applied to the zoom lens in addition to the coating for protection.

FIG. 1 illustrates an example in which optical member PP2 is arranged between the lens system and image plane Sim. Instead of arranging various filters, such as a low-pass filter and a filter that cuts a specific wavelength band, and the like between the lens system and image plane Sim, the various filters may be arranged between lenses. Alternatively, a coating having a similar action to the various filters may be applied to a lens surface of one of the lenses.

Next, numerical value examples of the zoom lens of the present disclosure will be described.

First, the zoom lens in Example 1 will be described. FIG. 1 is a cross section illustrating the lens configuration of the zoom lens in Example 1. In FIG. 1 and FIGS. 2 through 6 corresponding to Examples 2 through 6, which will be described later, optical member PP2 is also illustrated, and the left side is an object side, and the right side is an image side. Illustrated aperture stop St does not necessarily represent the size nor the shape of the aperture stop, but the position of the aperture stop on optical axis Z.

Table 1 shows basic lens data of the zoom lens in Example 1. Table 2 shows data about the specification of the zoom lens in Example 1. Table 3 shows data about moving surface distances of the zoom lens in Example 1. Table 4 shows data about aspheric coefficients of the zoom lens in Example 1. In the following descriptions, the meanings of signs in the tables will be described by using the tables of Example 1, as an example. The meanings of signs in the tables of Examples 2 through 6 are basically similar to those of Example 1.

In the lens data of Table 1, the column of Si shows the surface number of an i-th surface (i=1, 2, 3 . . . ) when a surface of composition elements closest to the object side is the first surface and surface numbers sequentially increase toward the image side. The column of Ri shows the curvature radius of the i-th surface. The column of Di shows a distance, on optical axis Z, between the i-th surface and the (i+1)th surface. Further, the column of Ndj shows the refractive index of a j-th optical element (j=1, 2, 3 . . . ) for d-line (wavelength is 587.6 nm) when an optical element closest to the object side is the first optical element and j sequentially increases toward the image side. The column of vdj shows the Abbe number of the same j-th optical element for d-line (wavelength is 587.6 nm).

Here, the sign of a curvature radius is positive when a surface shape is convex toward the object side, and negative when a surface shape is convex toward the image side. The basic lens data show data including aperture stop St and optical members PP1, PP2. In the column of surface numbers, the term "(STOP)" is written together with the surface number of a surface corresponding to aperture stop St. Further, in the lens data of Table 1, "DD[i]" is written in a row of a surface distance that changes during magnification change. Further, a value at the bottom of the column of Di is a distance between an image-side surface of optical member PP2 and image plane Sim.

Data about specification in Table 2 show values of a zoom ratio, focal length f', backfocus Bf', F-number FNo., full angle of view 2ω and stop diameter φ for each of wide angle, middle and telephoto.

In the basic lens data, data about specification and data about moving surface distances, degree is used as the unit of an angle, and mm is used as the unit of a length. However, since an optical system is usable by proportionally enlarging the optical system or by proportionally reducing the optical system, other appropriate units may be used.

In the lens data of Table 1, mark "*" is attached to the surface numbers of aspheric surfaces. Further, the numerical value of a paraxial curvature radius is used as the curvature radius of an aspheric surface. The data about aspheric coefficients in Table 4 show surface numbers Si of aspheric surfaces and aspheric coefficients about the aspheric surfaces. The aspheric coefficients are values of coefficients KA, Am (m=3, 4, 5, . . . 16) in an aspheric surface equation represented by the following equation (A):

$$Zd = C \cdot h^2 / \{1 + (1 - KA \cdot C^2 \cdot h^2)^{1/2}\} + \Sigma Am \cdot h^m \quad (A),$$

where

Zd: the depth of an aspheric surface (the length of a perpendicular from a point on the aspheric surface at height h to a flat plane that contacts with the vertex of the aspheric surface and is perpendicular to the optical axis), h: height (a length from the optical axis), C: a reciprocal of a paraxial curvature radius, and KA, Am: aspheric coefficients (m=3, 4, 5, . . . 16).

TABLE 1

EXAMPLE 1 • LENS DATA

| Si (SURFACE NUMBER) | Ri (CURVATURE RADIUS) | Di (SURFACE DISTANCE) | Ndj (REFRACTIVE INDEX) | vdj (Abbe NUMBER) |
|---|---|---|---|---|
| 1 | −200.0000 | 0.72 | 1.92286 | 20.88 |
| 2 | 14.4809 | 1.67 | | |
| 3 | ∞ | 10.80 | 1.78472 | 25.68 |
| 4 | ∞ | 0.04 | | |
| 5 | ∞ | 1.55 | 1.59282 | 68.63 |
| 6 | −24.8510 | 0.10 | | |
| *7 | 10.6342 | 2.19 | 1.62263 | 58.16 |
| *8 | −23.5238 | DD[8] | | |
| 9 | −29.3248 | 0.56 | 2.00100 | 29.13 |
| 10 | 5.5299 | 0.59 | | |
| 11 | 16.6262 | 2.13 | 1.92286 | 18.90 |
| 12 | −8.1339 | 0.55 | 1.83481 | 42.71 |
| 13 | 9.2541 | 0.30 | | |
| *14 | 22.7174 | 0.87 | 1.82115 | 24.06 |
| *15 | 1219.1605 | DD[15] | | |
| 16(STOP) | ∞ | 0.60 | | |
| *17 | 6.1142 | 3.00 | 1.51760 | 63.50 |
| *18 | −21.7163 | 0.80 | | |
| *19 | −42.0567 | 0.60 | 1.77250 | 49.47 |
| *20 | 20.0000 | DD[20] | | |
| 21 | 6.5534 | 3.31 | 1.49700 | 81.61 |
| 22 | −15.1527 | 0.57 | 2.00069 | 25.46 |
| 23 | 25.7867 | 0.25 | | |
| *24 | 8.5000 | 2.00 | 1.50957 | 56.38 |
| *25 | −7.2311 | DD[25] | | |
| 26 | −133.8413 | 0.55 | 1.88300 | 40.76 |
| 27 | 8.0000 | DD[27] | | |
| 28 | ∞ | 0.80 | 1.51680 | 64.20 |
| 29 | ∞ | 2.00 | | |

TABLE 2

EXAMPLE 1 • SPECIFICATION (d-LINE)

| | WIDE ANGLE | MIDDLE | TELEPHOTO |
|---|---|---|---|
| ZOOM RATIO | 1.0 | 2.3 | 4.7 |
| f' | 4.78 | 10.90 | 22.47 |
| Bf' | 6.43 | 9.64 | 12.04 |
| FNo. | 2.87 | 3.51 | 4.46 |
| 2ω[°] | 90.8 | 39.2 | 19.4 |
| STOP DIAMETER φ | 5.7 | 5.7 | 5.0 |

TABLE 3

EXAMPLE 1 • ZOOM DISTANCE

| | WIDE ANGLE | MIDDLE | TELEPHOTO |
|---|---|---|---|
| DD[8] | 0.30 | 3.92 | 6.62 |
| DD[15] | 7.38 | 3.75 | 1.06 |
| DD[20] | 5.90 | 2.85 | 1.34 |
| DD[25] | 2.34 | 2.15 | 1.27 |
| DD[27] | 3.90 | 7.11 | 9.51 |

TABLE 4

EXAMPLE 1 • ASPHERIC COEFFICIENT

| SURFACE NUMBER | 7 | 8 | 14 | 15 |
|---|---|---|---|---|
| KA | 1.5063078E+00 | 6.5135896E+00 | 9.8734878E+00 | −3.1504754E+02 |
| A3 | −1.9874843E−04 | 7.3978589E−05 | 1.3927818E−03 | −6.2774029E−04 |
| A4 | 1.9986066E−05 | 4.1714867E−06 | −2.2871297E−03 | 1.7344339E−03 |
| A5 | −5.5728603E−05 | 6.7013462E−05 | 4.8565546E−03 | −1.4519146E−03 |
| A6 | 1.3258027E−05 | −2.6348752E−06 | −3.2133628E−03 | 5.3924320E−04 |
| A7 | 1.0767429E−07 | −9.5978638E−07 | 4.0541116E−04 | 5.5061045E−06 |
| A8 | −3.7552903E−07 | −2.4169430E−07 | 5.4980348E−04 | −1.1198679E−04 |
| A9 | −4.2559359E−08 | −3.5355198E−08 | −2.2002949E−04 | 4.5916975E−05 |
| A10 | 1.6782783E−09 | −3.9110624E−09 | −9.5918301E−06 | 6.8296938E−06 |
| A11 | 2.4362232E−09 | 4.6399809E−09 | 1.7172833E−05 | −8.3949500E−06 |
| A12 | 2.5016577E−10 | 1.1676005E−09 | −2.2452685E−06 | 1.4696038E−06 |
| A13 | −2.7795902E−11 | 1.0136486E−10 | | |
| A14 | −1.1392433E−11 | −6.3583677E−11 | | |
| A15 | −2.9111829E−12 | −2.8164001E−11 | | |
| A16 | 6.2211564E−13 | 5.3058093E−12 | | |

| SURFACE NUMBER | 17 | 18 | 19 | 20 |
|---|---|---|---|---|
| KA | −1.7131274E−01 | 2.6949707E+01 | 9.7310287E+00 | 2.9363126E+00 |
| A3 | −7.4549573E−05 | −1.0247646E−03 | −3.3862686E−03 | −2.5450703E−03 |
| A4 | 2.7238570E−04 | 6.8611858E−04 | 4.7887791E−04 | 4.9589628E−04 |
| A5 | 2.0872138E−04 | 5.5157654E−04 | 6.4160466E−04 | 1.9737981E−04 |
| A6 | −1.9935263E−05 | 2.7359008E−05 | −7.0545383E−05 | 1.1933814E−05 |
| A7 | −1.2108436E−05 | −6.2629471E−05 | −3.2189659E−05 | 1.3786716E−06 |
| A8 | −1.6175227E−06 | −7.6677298E−06 | −1.5887069E−06 | −1.6864829E−06 |
| A9 | 9.6832626E−07 | 2.7106991E−06 | 1.3532728E−06 | −4.8906269E−07 |
| A10 | 2.2056508E−07 | 1.5467099E−06 | 5.8517734E−07 | −1.2811167E−07 |
| A11 | 8.1513518E−08 | 1.4634072E−07 | 5.7180721E−08 | 2.6799160E−08 |
| A12 | −3.0912989E−08 | −1.0324887E−07 | −3.6692328E−08 | 2.0555952E−08 |

| SURFACE NUMBER | 24 | 25 |
|---|---|---|
| KA | −4.3675074E−01 | −9.4634045E−01 |
| A3 | 1.1781977E−03 | 1.3125474E−03 |
| A4 | −3.1618299E−03 | −1.9322450E−03 |
| A5 | 1.5860016E−03 | 1.5707240E−03 |
| A6 | −4.8695170E−04 | −4.3804319E−04 |
| A7 | −1.6602694E−05 | −8.1402596E−06 |
| A8 | 2.3199459E−05 | 1.3521762E−06 |
| A9 | 1.0058751E−05 | 7.0573822E−06 |
| A10 | −4.5718432E−06 | 2.9655926E−06 |
| A11 | 1.6748966E−07 | −2.1464591E−06 |
| A12 | 6.8425566E−08 | 2.8943261E−07 |

FIG. 7, Sections A through L are aberration diagrams of the zoom lens in Example 1. FIG. 7, Sections A through D illustrate a spherical aberration, astigmatism, distortion and a lateral chromatic aberration at wide angle, respectively. FIG. 7, Sections E through H illustrate a spherical aberration, astigmatism, distortion and a lateral chromatic aberration at middle, respectively. FIG. 7, Sections I through L illustrate a spherical aberration, astigmatism, distortion and a lateral chromatic aberration at telephoto, respectively.

Aberration diagrams of a spherical aberration, astigmatism and distortion show aberrations when d-line (wavelength is 587.6 nm) is a reference wavelength. In the aberration diagram of the spherical aberration, aberrations for d-line (wavelength is 587.6 nm), the wavelength of 460.0 nm and the wavelength of 615.0 nm are indicated by a solid line, a dot dash line and a two-dot dash line, respectively. In the aberration diagram of the astigmatism, an aberration in a sagittal direction and an aberration in a tangential direction are indicated by a solid line and a dotted line, respectively. In the aberration diagram of the lateral chromatic aberration, aberrations for the wavelength of 460.0 nm and the wavelength of 615.0 nm are indicated by a dot dashed line and a two-dot dashed line, respectively. In the aberration diagram of the spherical aberration, FNo. represents an F-number. In the other aberration diagrams, ω means a half angle of view.

Next, a zoom lens in Example 2 will be described. FIG. 2 is a cross section illustrating the lens configuration of the zoom lens in Example 2. Table 5 shows basic lens data of the zoom lens in Example 2. Table 6 shows data about the specification of the zoom lens in Example 2. Table 7 shows data about moving surface distances. Table 8 shows data about aspheric coefficients. FIG. 8, Sections A through L illustrate aberration diagrams.

TABLE 5

EXAMPLE 2 • LENS DATA

| Si (SURFACE NUMBER) | Ri (CURVATURE RADIUS) | Di (SURFACE DISTANCE) | Ndj (REFRACTIVE INDEX) | vdj (Abbe NUMBER) |
|---|---|---|---|---|
| 1 | 30.0001 | 0.74 | 2.00272 | 19.32 |
| 2 | 8.5740 | 3.50 | | |
| 3 | ∞ | 11.00 | 1.78472 | 25.68 |

TABLE 5-continued

EXAMPLE 2 • LENS DATA

| Si (SURFACE NUMBER) | Ri (CURVATURE RADIUS) | Di (SURFACE DISTANCE) | Ndj (REFRACTIVE INDEX) | vdj (Abbe NUMBER) |
|---|---|---|---|---|
| 4 | ∞ | 0.04 | | |
| 5 | ∞ | 1.80 | 1.59282 | 68.63 |
| 6 | −19.4033 | 0.10 | | |
| *7 | 12.3193 | 2.19 | 1.61881 | 63.85 |
| *8 | −20.0000 | DD[8] | | |
| 9 | −26.6977 | 0.56 | 2.00100 | 29.13 |
| 10 | 5.9774 | 0.63 | | |
| 11 | 23.8148 | 2.27 | 1.92286 | 18.90 |
| 12 | −6.6947 | 0.55 | 1.77250 | 49.60 |
| 13 | 9.1809 | 0.30 | | |
| *14 | 12.2035 | 0.87 | 1.82115 | 24.06 |
| *15 | 14.9210 | DD[15] | | |
| 16(STOP) | ∞ | 0.60 | | |
| *17 | 6.2807 | 3.00 | 1.51760 | 63.50 |
| *18 | −21.7251 | 1.00 | | |
| *19 | −42.4225 | 0.60 | 1.77250 | 49.47 |
| *20 | 23.9992 | DD[20] | | |
| 21 | 9.7694 | 2.17 | 1.49700 | 81.61 |
| 22 | −180.1722 | 0.10 | | |
| 23 | 8.9158 | 3.29 | 1.49700 | 81.61 |
| 24 | −10.0000 | 0.57 | 2.00100 | 29.13 |
| 25 | 13.1347 | 0.25 | | |
| *26 | 8.4999 | 2.19 | 1.50957 | 56.38 |
| *27 | −6.8469 | DD[27] | | |
| 28 | 240.3705 | 0.55 | 1.88300 | 40.76 |
| 29 | 9.1071 | DD[29] | | |
| 30 | ∞ | 0.80 | 1.51680 | 64.20 |
| 31 | ∞ | 2.00 | | |

TABLE 6

EXAMPLE 2 • SPECIFICATION (d-LINE)

| | WIDE ANGLE | MIDDLE | TELEPHOTO |
|---|---|---|---|
| ZOOM RATIO | 1.0 | 2.3 | 4.7 |
| f' | 3.99 | 9.10 | 18.78 |
| Bf' | 6.11 | 9.86 | 12.33 |
| FNo. | 2.87 | 3.56 | 4.82 |
| 2ω[°] | 100.6 | 46.2 | 23.0 |
| STOP DIAMETERφ | 5.7 | 5.7 | 4.8 |

TABLE 7

EXAMPLE 2 • ZOOM DISTANCE

| | WIDE ANGLE | MIDDLE | TELEPHOTO |
|---|---|---|---|
| DD[8] | 0.30 | 3.63 | 6.14 |
| DD[15] | 6.89 | 3.56 | 1.05 |
| DD[20] | 7.05 | 3.34 | 1.41 |
| DD[27] | 1.84 | 1.77 | 1.23 |
| DD[29] | 3.58 | 7.33 | 9.80 |

TABLE 8

EXAMPLE 2 • ASPHERIC COEFFICIENT

| SURFACE NUMBER | 7 | 8 | 14 | 15 |
|---|---|---|---|---|
| KA | 8.7901619E−01 | 8.2830474E+00 | −2.5710319E+01 | −2.4482248E+01 |
| A3 | −3.2291857E−04 | 2.7987269E−05 | 2.4500840E−03 | 2.9365826E−04 |
| A4 | 1.1123226E−04 | −7.2279776E−06 | −2.5134755E−03 | 7.4790823E−04 |
| A5 | −6.3443881E−05 | 7.6850631E−05 | 5.0349424E−03 | −1.0168462E−03 |
| A6 | 1.3793059E−05 | −1.5129545E−06 | −3.1306755E−03 | 5.5656836E−04 |
| A7 | 6.1955542E−07 | −6.4006540E−07 | 3.7045725E−04 | −3.2134572E−05 |
| A8 | −2.8591659E−07 | −2.2405711E−07 | 5.1447793E−04 | −1.2013412E−04 |
| A9 | −4.3943363E−08 | −3.6706882E−08 | −2.0260149E−04 | 5.3605835E−05 |
| A10 | −8.8100581E−10 | −5.4143096E−09 | −1.0821143E−05 | 4.1811043E−06 |
| A11 | 1.5022681E−09 | 4.6028209E−09 | 1.6803099E−05 | −7.3999227E−06 |
| A12 | 1.4948380E−10 | 1.1345828E−09 | −2.2260730E−06 | 1.2894494E−06 |
| A13 | −6.8170981E−12 | 9.6787308E−11 | | |
| A14 | 3.5801175E−12 | −5.0793741E−11 | | |
| A15 | −1.1155002E−12 | −2.6489407E−11 | | |
| A16 | 1.3620523E−13 | 4.8583801E−12 | | |

| SURFACE NUMBER | 17 | 18 | 19 | 20 |
|---|---|---|---|---|
| KA | 7.6249695E−02 | 2.5319682E+01 | 2.7913470E+01 | −9.0898954E+00 |
| A3 | 1.6040128E−05 | −9.1696032E−04 | −2.5836462E−03 | −1.9839747E−03 |
| A4 | −8.8549878E−05 | 1.0371926E−03 | 8.4367228E−04 | 1.0033170E−03 |
| A5 | 4.0087233E−04 | 4.0049669E−04 | 8.8626543E−05 | −4.2489703E−04 |
| A6 | −6.7488422E−05 | 1.4726687E−05 | −6.2258613E−05 | 8.9188034E−05 |
| A7 | −1.7393329E−05 | −5.2913499E−05 | 7.4968215E−06 | 1.4730309E−05 |
| A8 | 2.1237484E−06 | 6.1171088E−07 | 3.9086652E−07 | −2.8502106E−08 |
| A9 | 1.6901443E−06 | 1.4776309E−06 | −1.0494146E−07 | −1.0526125E−06 |
| A10 | 3.8927424E−08 | 5.5941775E−07 | 2.0235325E−07 | −1.3258291E−07 |
| A11 | −4.1524993E−08 | 2.1684270E−07 | 2.3952238E−08 | −2.1009564E−08 |
| A12 | −2.4969837E−09 | −6.7995917E−08 | −1.2636594E−08 | 2.0299424E−08 |

TABLE 8-continued

EXAMPLE 2 • ASPHERIC COEFFICIENT

| SURFACE NUMBER | 26 | 27 |
|---|---|---|
| KA | 1.0491302E+00 | −1.6723807E−01 |
| A3 | 1.3708922E−03 | 1.9578943E−03 |
| A4 | −2.9973909E−03 | −2.3730938E−03 |
| A5 | 1.3858577E−03 | 1.7838280E−03 |
| A6 | −4.3362477E−04 | −4.6178230E−04 |
| A7 | −1.0360047E−05 | −1.6652761E−05 |
| A8 | 2.1284481E−05 | 1.6895191E−06 |
| A9 | 9.5320414E−06 | 7.4987026E−06 |
| A10 | −4.5237310E−06 | 3.0586779E−06 |
| A11 | 2.2688204E−07 | −2.1641708E−06 |
| A12 | 5.7861980E−08 | 2.8543119E−07 |

Next, a zoom lens in Example 3 will be described. FIG. 3 is a cross section illustrating the lens configuration of the zoom lens in Example 3. Table 9 shows basic lens data of the zoom lens in Example 3. Table 10 shows data about the specification of the zoom lens in Example 3. Table 11 shows data about moving surface distances. Table 12 shows data about aspheric coefficients. FIG. 9, Sections A through L illustrate aberration diagrams.

TABLE 9

EXAMPLE 3 • LENS DATA

| Si (SURFACE NUMBER) | Ri (CURVATURE RADIUS) | Di (SURFACE DISTANCE) | Ndj (REFRACTIVE INDEX) | νdj (Abbe NUMBER) |
|---|---|---|---|---|
| 1 | −200.0725 | 0.72 | 1.92286 | 20.88 |
| 2 | 14.1226 | 1.66 | | |
| 3 | ∞ | 10.80 | 1.78472 | 25.68 |
| 4 | ∞ | 0.04 | | |
| 5 | ∞ | 1.59 | 1.59282 | 68.63 |
| 6 | −23.0924 | 0.10 | | |
| *7 | 10.6528 | 2.19 | 1.62263 | 58.16 |
| *8 | −24.4566 | DD[8] | | |
| 9 | −29.7988 | 0.56 | 2.00100 | 29.13 |
| 10 | 5.5569 | 0.59 | | |
| 11 | 16.1885 | 2.13 | 1.94595 | 17.98 |
| 12 | −8.5478 | 0.55 | 1.88300 | 40.76 |
| 13 | 10.4153 | 0.30 | | |
| *14 | 29.9779 | 0.87 | 1.82115 | 24.06 |
| *15 | −2435.4786 | DD[15] | | |
| 16(STOP) | ∞ | 0.60 | | |
| *17 | 6.0972 | 3.00 | 1.51760 | 63.50 |
| *18 | −21.7121 | 0.80 | | |
| *19 | −44.2647 | 0.60 | 1.77250 | 49.47 |
| *20 | 20.0000 | DD[20] | | |
| 21 | 6.5101 | 3.31 | 1.49700 | 81.61 |
| 22 | −15.4226 | 0.57 | 2.00069 | 25.46 |
| 23 | 25.1554 | 0.25 | | |
| *24 | 8.5001 | 1.98 | 1.50957 | 56.38 |
| *25 | −7.3170 | DD[25] | | |
| 26 | −125.8383 | 0.55 | 1.88300 | 40.76 |
| 27 | 8.0000 | DD[27] | | |
| 28 | ∞ | 0.80 | 1.51680 | 64.20 |
| 29 | ∞ | 2.00 | | |

TABLE 10

EXAMPLE 3 • SPECIFICATION (d-LINE)

| | WIDE ANGLE | MIDDLE | TELEPHOTO |
|---|---|---|---|
| ZOOM RATIO | 1.0 | 2.3 | 4.7 |
| f | 4.76 | 10.87 | 22.42 |
| Bf | 6.47 | 9.69 | 11.96 |
| FNo. | 2.89 | 3.53 | 4.46 |
| 2ω [°] | 91.2 | 39.2 | 19.4 |
| STOP DIAMETERφ | 5.7 | 5.7 | 5.0 |

TABLE 11

EXAMPLE 3 • ZOOM DISTANCE

| | WIDE ANGLE | MIDDLE | TELEPHOTO |
|---|---|---|---|
| DD[8] | 0.30 | 3.89 | 6.59 |
| DD[15] | 7.35 | 3.76 | 1.06 |
| DD[20] | 5.88 | 2.79 | 1.36 |
| DD[25] | 2.33 | 2.18 | 1.34 |
| DD[27] | 3.94 | 7.16 | 9.43 |

TABLE 12

EXAMPLE 3 • ASPHERIC COEFFICIENT

| | SURFACE NUMBER | | | |
|---|---|---|---|---|
| | 7 | 8 | 14 | 15 |
| KA | 1.5223921E+00 | 4.0387455E+00 | 6.4127941E+00 | −1.1696469E+02 |
| A3 | −2.4973740E−04 | −1.0459004E−05 | 1.7159267E−03 | −3.4706338E−04 |
| A4 | 3.9766026E−05 | 2.9578790E−05 | −2.5977689E−03 | 1.4808797E−03 |
| A5 | −4.9348639E−05 | 5.6981864E−05 | 5.0709046E−03 | −1.3579579E−03 |
| A6 | 1.0968795E−05 | −3.1896741E−06 | −3.2595198E−03 | 6.0896409E−04 |
| A7 | −2.1717098E−08 | −8.7375962E−07 | 4.1814588E−04 | −3.3248546E−05 |

TABLE 12-continued

EXAMPLE 3 • ASPHERIC COEFFICIENT

| A8  | −3.2050322E−07 | −1.9827163E−07 | 5.4145493E−04  | −1.1804231E−04 |
|-----|----------------|----------------|----------------|----------------|
| A9  | −2.6034367E−08 | −2.4532307E−08 | −2.1767728E−04 | 5.0888274E−05  |
| A10 | 2.9434265E−09  | −1.9830750E−09 | −1.1248863E−05 | 7.1204834E−06  |
| A11 | 2.1412163E−09  | 4.1016855E−09  | 1.8075679E−05  | −8.7789197E−06 |
| A12 | 1.6270722E−10  | 9.6126827E−10  | −2.3980428E−06 | 1.5014206E−06  |
| A13 | −4.1446936E−11 | 8.3383693E−11  |                |                |
| A14 | −1.2254434E−11 | −5.6020016E−11 |                |                |
| A15 | −2.2417058E−12 | −2.5923188E−11 |                |                |
| A16 | 7.5677465E−13  | 5.0469984E−12  |                |                |

SURFACE NUMBER

|     | 17             | 18             | 19             | 20             |
|-----|----------------|----------------|----------------|----------------|
| KA  | 2.4604833E−01  | 3.0000030E+01  | −1.4169417E+01 | 1.2578405E+01  |
| A3  | −2.7921641E−05 | −9.1914319E−04 | −2.9612796E−03 | −2.1027124E−03 |
| A4  | 1.9789253E−05  | 1.0371036E−03  | 9.0435452E−04  | 4.6246504E−04  |
| A5  | 2.4490298E−04  | 4.4967677E−04  | 2.4678030E−04  | −5.0358489E−06 |
| A6  | −3.3734954E−05 | −1.4660943E−05 | −3.6840335E−05 | 3.0252568E−05  |
| A7  | −1.6017001E−05 | −5.3430129E−05 | −1.3278072E−05 | 1.2430420E−05  |
| A8  | 2.1734597E−07  | −4.2915024E−06 | −2.2480661E−07 | 1.2238234E−07  |
| A9  | 8.9422849E−07  | 3.0757569E−06  | 1.0301605E−06  | −9.1956452E−07 |
| A10 | 2.7733954E−07  | 1.3552371E−06  | 3.8470534E−07  | −2.6190445E−07 |
| A11 | 4.3368194E−08  | 5.3180129E−08  | 8.0406353E−09  | −1.5744791E−08 |
| A12 | −2.6086016E−08 | −8.1276334E−08 | −2.2792474E−08 | 3.2621413E−08  |

SURFACE NUMBER

|     | 24             | 25             |
|-----|----------------|----------------|
| KA  | −3.1124812E−01 | −1.3090700E+00 |
| A3  | 1.2518121E−03  | 1.3704266E−03  |
| A4  | −3.2343798E−03 | −2.1242483E−03 |
| A5  | 1.5447326E−03  | 1.6071454E−03  |
| A6  | −4.5969915E−04 | −4.4775389E−04 |
| A7  | −1.8523490E−05 | −5.8213370E−06 |
| A8  | 2.1505147E−05  | 1.8809933E−06  |
| A9  | 1.0211651E−05  | 6.8425517E−06  |
| A10 | −4.5206279E−06 | 2.9178752E−06  |
| A11 | 1.6826024E−07  | −2.1329917E−06 |
| A12 | 6.7984370E−08  | 2.9068552E−07  |

Next, a zoom lens in Example 4 will be described. FIG. 4 is a cross section illustrating the lens configuration of the zoom lens in Example 4. Table 13 shows basic lens data of the zoom lens in Example 4. Table 14 shows data about the specification of the zoom lens in Example 3. Table 15 shows data about moving surface distances. Table 16 shows data about aspheric coefficients. FIG. 10, Sections A through L illustrate aberration diagrams.

TABLE 13

EXAMPLE 4 • LENS DATA

| Si (SURFACE NUMBER) | Ri (CUR-VATURE RADIUS) | Di (SURFACE DISTANCE) | Ndj (REFRACTIVE INDEX) | vdj (Abbe NUMBER) |
|---|---|---|---|---|
| 1  | −200.0018 | 0.72    | 1.92286 | 20.88 |
| 2  | 13.9823   | 1.66    |         |       |
| 3  | ∞         | 10.80   | 1.78472 | 25.68 |
| 4  | ∞         | 0.04    |         |       |
| 5  | ∞         | 1.54    | 1.59282 | 68.63 |
| 6  | −23.0605  | 0.10    |         |       |
| *7 | 11.8467   | 2.19    | 1.69680 | 55.46 |
| *8 | −30.1264  | DD[8]   |         |       |
| 9  | −30.9654  | 0.56    | 2.00100 | 29.13 |
| 10 | 5.9221    | 0.59    |         |       |

TABLE 13-continued

EXAMPLE 4 • LENS DATA

| Si (SURFACE NUMBER) | Ri (CUR-VATURE RADIUS) | Di (SURFACE DISTANCE) | Ndj (REFRACTIVE INDEX) | vdj (Abbe NUMBER) |
|---|---|---|---|---|
| 11      | 20.5606   | 2.13    | 1.95906 | 17.47 |
| 12      | −7.9501   | 0.55    | 1.91082 | 35.25 |
| 13      | 10.0146   | 0.30    |         |       |
| *14     | 20.6675   | 0.87    | 1.82115 | 24.06 |
| *15     | −593.5459 | DD[15]  |         |       |
| 16(STOP)| ∞         | 0.60    |         |       |
| *17     | 6.1495    | 3.00    | 1.51760 | 63.50 |
| *18     | −21.7267  | 0.80    |         |       |
| *19     | −40.7340  | 0.60    | 1.77250 | 49.47 |
| *20     | 20.0000   | DD[20]  |         |       |
| 21      | 6.4160    | 3.31    | 1.49700 | 81.61 |
| 22      | −16.7642  | 0.57    | 2.00069 | 25.46 |
| 23      | 23.0167   | 0.25    |         |       |
| *24     | 8.5000    | 1.97    | 1.50957 | 56.38 |
| *25     | −7.2779   | DD[25]  |         |       |
| 26      | −151.3783 | 0.55    | 1.88300 | 40.76 |
| 27      | 8.0000    | DD[27]  |         |       |
| 28      | ∞         | 0.80    | 1.51680 | 64.20 |
| 29      | ∞         | 2.00    |         |       |

TABLE 14

EXAMPLE 4 • SPECIFICATION (d-LINE)

| | WIDE ANGLE | MIDDLE | TELEPHOTO |
|---|---|---|---|
| ZOOM RATIO | 1.0 | 2.3 | 4.7 |
| f | 4.74 | 10.81 | 22.29 |
| Bf | 6.46 | 9.73 | 12.08 |
| FNo. | 2.88 | 3.53 | 4.77 |
| 2ω [°] | 91.6 | 39.4 | 19.4 |
| STOP DIAMETERφ | 5.7 | 5.7 | 4.7 |

TABLE 15

EXAMPLE 4 • ZOOM DISTANCE

| | WIDE ANGLE | MIDDLE | TELEPHOTO |
|---|---|---|---|
| DD[8] | 0.30 | 4.01 | 6.81 |
| DD[15] | 7.56 | 3.85 | 1.05 |
| DD[20] | 5.85 | 2.74 | 1.22 |
| DD[25] | 2.29 | 2.10 | 1.27 |
| DD[27] | 3.93 | 7.20 | 9.55 |

TABLE 16

EXAMPLE 4 • ASPHERIC COEFFICIENT

| | SURFACE NUMBER | | | |
|---|---|---|---|---|
| | 7 | 8 | 14 | 15 |
| KA | 1.5805149E+00 | 6.4265254E+00 | −1.4700702E+01 | −3.0334565E+01 |
| A3 | −2.5391452E−04 | −3.4840204E−05 | 1.8598772E−03 | −2.1494197E−04 |
| A4 | 6.4710082E−05 | 1.2773770E−05 | −2.6981539E−03 | 1.2966907E−03 |
| A5 | −4.6202122E−05 | 5.3701895E−05 | 5.1157520E−03 | −1.3842468E−03 |
| A6 | 1.0689299E−05 | −3.3429030E−06 | −3.2897768E−03 | 6.3071134E−04 |
| A7 | −8.1914162E−08 | −8.5996739E−07 | 4.1715252E−04 | −3.1662390E−05 |
| A8 | −3.2091315E−07 | −1.9760344E−07 | 5.4967422E−04 | −1.1719871E−04 |
| A9 | −2.5444162E−08 | −2.2011477E−08 | −2.1769369E−04 | 4.9752501E−05 |
| A10 | 2.9900682E−09 | −1.9247983E−09 | −1.3368604E−05 | 6.3776962E−06 |
| A11 | 2.0718335E−09 | 4.0534002E−09 | 1.8731342E−05 | −8.2077237E−06 |
| A12 | 1.9244496E−10 | 9.7600625E−10 | −2.4538162E−06 | 1.4115036E−06 |
| A13 | −3.5512848E−11 | 8.1135866E−11 | | |
| A14 | −9.7655413E−12 | −5.4324269E−11 | | |
| A15 | −2.2319664E−12 | −2.5807445E−11 | | |
| A16 | 5.9061107E−13 | 4.9289733E−12 | | |

| | SURFACE NUMBER | | | |
|---|---|---|---|---|
| | 17 | 18 | 19 | 20 |
| KA | 6.0544124E−02 | 2.9873619E+01 | −3.0000016E+01 | 3.5628093E+00 |
| A3 | 6.0469853E−05 | −6.3642668E−04 | −2.2061799E−03 | −1.4816278E−03 |
| A4 | 1.1491093E−04 | 1.1031836E−03 | 5.5112692E−04 | 1.7250945E−04 |
| A5 | 2.3983992E−04 | 3.9175027E−04 | 1.9259470E−04 | 3.7392505E−05 |
| A6 | −2.7048681E−05 | −1.9494964E−05 | −2.4771782E−05 | 3.4140630E−05 |
| A7 | −1.4520796E−05 | −4.9085455E−05 | −1.0801015E−05 | 1.0893581E−05 |
| A8 | −9.7895050E−07 | −3.0653630E−06 | 2.7120486E−07 | −6.5912561E−08 |
| A9 | 1.0703490E−06 | 2.9299701E−06 | 8.6782136E−07 | −7.4100579E−07 |
| A10 | 2.8897439E−07 | 1.2202689E−06 | 2.8457342E−07 | −2.6277347E−07 |
| A11 | 5.3926552E−08 | 1.0403775E−07 | 4.2729175E−08 | −1.3558054E−08 |
| A12 | −3.0002877E−08 | −9.0407623E−08 | −2.5553777E−08 | 3.2476594E−08 |

| | SURFACE NUMBER | |
|---|---|---|
| | 24 | 25 |
| KA | −3.5613915E−01 | −1.3151626E+00 |
| A3 | 1.1400081E−03 | 1.2669328E−03 |
| A4 | −3.2063215E−03 | −2.0860536E−03 |
| A5 | 1.5455636E−03 | 1.6278193E−03 |
| A6 | −4.6036346E−04 | −4.5432496E−04 |
| A7 | −2.0392343E−05 | −6.5530752E−06 |
| A8 | 2.1434757E−05 | 1.9693499E−06 |
| A9 | 1.0257772E−05 | 6.8822403E−06 |
| A10 | −4.4960069E−06 | 2.9079776E−06 |
| A11 | 1.6654848E−07 | −2.1304004E−06 |
| A12 | 6.8124340E−08 | 2.9130262E−07 |

Next, a zoom lens in Example 5 will be described. FIG. 5 is a cross section illustrating the lens configuration of the zoom lens in Example 5. Table 17 shows basic lens data of the zoom lens in Example 5. Table 18 shows data about the specification of the zoom lens in Example 5. Table 19 shows data about moving surface distances. Table 20 shows data about aspheric coefficients. FIG. 11, Sections A through L illustrate aberration diagrams.

TABLE 17

EXAMPLE 5 • LENS DATA

| Si (SURFACE NUMBER) | Ri (CURVATURE RADIUS) | Di (SURFACE DISTANCE) | Ndj (REFRACTIVE INDEX) | νdj (Abbe NUMBER) |
|---|---|---|---|---|
| 1 | 40.0865 | 0.74 | 2.00272 | 19.32 |
| 2 | 8.9328 | 3.26 | | |
| 3 | ∞ | 11.00 | 1.78472 | 25.68 |
| 4 | ∞ | 0.04 | | |
| 5 | ∞ | 1.80 | 1.59282 | 68.63 |
| 6 | −19.1110 | 0.10 | | |
| *7 | 12.8211 | 2.22 | 1.61881 | 63.85 |
| *8 | −20.0005 | DD[8] | | |
| 9 | −27.7488 | 0.56 | 1.88300 | 40.76 |
| 10 | 5.6258 | 0.63 | | |
| 11 | 22.9781 | 2.13 | 1.95906 | 17.47 |
| 12 | −8.7648 | 0.55 | 1.91082 | 35.25 |
| 13 | 10.6279 | 0.30 | | |
| *14 | 14.2874 | 0.87 | 1.82115 | 24.06 |
| *15 | 21.0445 | DD[15] | | |
| 16(STOP) | ∞ | 0.60 | | |
| *17 | 6.3817 | 3.00 | 1.51760 | 63.50 |
| *18 | −21.6847 | 1.00 | | |
| *19 | −48.0133 | 0.60 | 1.77250 | 49.47 |
| *20 | 23.9992 | DD[20] | | |
| 21 | 8.4619 | 2.17 | 1.49700 | 81.61 |
| 22 | 67.6244 | 0.10 | | |
| 23 | 10.1872 | 3.09 | 1.49700 | 81.61 |
| 24 | −10.0000 | 0.57 | 2.00100 | 29.13 |
| 25 | 16.2860 | 0.25 | | |
| *26 | 8.4999 | 2.16 | 1.50957 | 56.38 |
| *27 | −6.9808 | DD[27] | | |
| 28 | 64.9492 | 0.55 | 1.88300 | 40.76 |
| 29 | 8.0000 | DD[29] | | |
| 30 | ∞ | 0.80 | 1.51680 | 64.20 |
| 31 | ∞ | 2.00 | | |

TABLE 18

EXAMPLE 5 • SPECIFICATION (d-LINE)

| | WIDE ANGLE | MIDDLE | TELEPHOTO |
|---|---|---|---|
| ZOOM RATIO | 1.0 | 2.3 | 4.7 |
| f | 3.98 | 9.07 | 18.72 |
| Bf | 6.27 | 10.26 | 12.72 |
| FNo. | 2.90 | 3.61 | 4.80 |
| 2ω [°] | 101.6 | 46.2 | 23.0 |
| STOP DIAMETERφ | 5.7 | 5.7 | 4.9 |

TABLE 19

EXAMPLE 5 • ZOOM DISTANCE

| | WIDE ANGLE | MIDDLE | TELEPHOTO |
|---|---|---|---|
| DD[8] | 0.30 | 3.74 | 6.37 |
| DD[15] | 7.12 | 3.68 | 1.05 |
| DD[20] | 7.20 | 3.27 | 1.18 |
| DD[27] | 1.77 | 1.67 | 1.31 |
| DD[29] | 3.75 | 7.74 | 10.19 |

TABLE 20

EXAMPLE 5 • ASPHERIC COEFFICIENT

| | SURFACE NUMBER | | | |
|---|---|---|---|---|
| | 7 | 8 | 14 | 15 |
| KA | 1.0619958E+00 | 8.1599296E+00 | −2.6152412E+01 | −2.4808417E+01 |
| A3 | −2.7137528E−04 | 8.5620272E−05 | 1.7927475E−03 | −1.8198141E−04 |
| A4 | 1.0539765E−04 | −1.2799223E−05 | −2.4905221E−03 | 6.9442375E−04 |
| A5 | −6.2866176E−05 | 7.6976093E−05 | 5.0345252E−03 | −1.0183525E−03 |
| A6 | 1.3754135E−05 | −1.5278223E−06 | −3.1306746E−03 | 5.5654431E−04 |
| A7 | 6.1870391E−07 | −6.4062546E−07 | 3.7045614E−04 | −3.2134979E−05 |
| A8 | −2.8589893E−07 | −2.2404376E−07 | 5.1447788E−04 | −1.2013412E−04 |
| A9 | −4.3943639E−08 | −3.6707917E−08 | −2.0260149E−04 | 5.3605835E−05 |
| A10 | −8.8104509E−10 | −5.4143101E−09 | −1.0821143E−05 | 4.1811043E−06 |
| A11 | 1.5022669E−09 | 4.6028171E−09 | 1.6803099E−05 | −7.3999227E−06 |
| A12 | 1.4948366E−10 | 1.1345828E−09 | −2.2260730E−06 | 1.2894494E−06 |
| A13 | −6.8171013E−12 | 9.6787308E−11 | | |
| A14 | 3.5801175E−12 | −5.0793741E−11 | | |
| A15 | −1.1155002E−12 | −2.6489407E−11 | | |
| A16 | 1.3620523E−13 | 4.8583801E−12 | | |

| | SURFACE NUMBER | | | |
|---|---|---|---|---|
| | 17 | 18 | 19 | 20 |
| KA | 1.4467411E−01 | 2.5069793E+01 | 2.7689207E+01 | −9.4854507E+00 |
| A3 | 1.9197315E−05 | −9.2863187E−04 | −2.9602816E−03 | −2.3758521E−03 |
| A4 | −8.9281012E−05 | 1.0563163E−03 | 8.2939650E−04 | 1.0158716E−03 |
| A5 | 3.9992931E−04 | 3.9944938E−04 | 8.8712821E−05 | −4.2572017E−04 |
| A6 | −6.7484305E−05 | 1.4707381E−05 | −6.2242377E−05 | 8.9169827E−05 |
| A7 | −1.7393663E−05 | −5.2913218E−05 | 7.4957431E−06 | 1.4729174E−05 |

TABLE 20-continued

EXAMPLE 5 • ASPHERIC COEFFICIENT

| A8 | 2.1237559E−06 | 6.1174376E−07 | 3.9085828E−07 | −2.8453352E−08 |
|---|---|---|---|---|
| A9 | 1.6901443E−06 | 1.4776313E−06 | −1.0494133E−07 | −1.0526123E−06 |
| A10 | 3.8927423E−08 | 5.5941775E−07 | 2.0235325E−07 | −1.3258291E−07 |
| A11 | −4.1524993E−08 | 2.1684270E−07 | 2.3952238E−08 | −2.1009565E−08 |
| A12 | −2.4969837E−09 | −6.7995917E−08 | −1.2636594E−08 | 2.0299424E−08 |

| | SURFACE NUMBER | |
|---|---|---|
| | 26 | 27 |
| KA | 2.9156147E−01 | −2.1735570E−01 |
| A3 | 1.5373699E−03 | 2.1343772E−03 |
| A4 | −3.0064680E−03 | −2.3753836E−03 |
| A5 | 1.3854072E−03 | 1.7833560E−03 |
| A6 | −4.3362576E−04 | −4.6178939E−04 |
| A7 | −1.0359899E−05 | −1.6653377E−05 |
| A8 | 2.1284471E−05 | 1.6894900E−06 |
| A9 | 9.5320420E−06 | 7.4986998E−06 |
| A10 | −4.5237310E−06 | 3.0586778E−06 |
| A11 | 2.2688204E−07 | −2.1641708E−06 |
| A12 | 5.7861980E−08 | 2.8543119E−07 |

Next, a zoom lens in Example 6 will be described. FIG. 6 is a cross section illustrating the lens configuration of the zoom lens in Example 6. Table 21 shows basic lens data of the zoom lens in Example 6, Table 22 shows data about the specification of the zoom lens in Example 6. Table 23 shows data about moving surface distances. Table 24 shows data about aspheric coefficients. FIG. 12, Sections A through L illustrate aberration diagrams.

TABLE 21

TABLE 21-continued

EXAMPLE 6 • LENS DATA

| Si (SURFACE NUMBER) | Ri (CURVATURE RADIUS) | Di (SURFACE DISTANCE) | Ndj (REFRACTIVE INDEX) | vdj (Abbe NUMBER) |
|---|---|---|---|---|
| 1 | 31.8283 | 0.74 | 1.95906 | 17.47 |
| 2 | 8.5150 | 3.50 | | |
| 3 | ∞ | 11.00 | 1.78472 | 25.68 |
| 4 | ∞ | 0.04 | | |
| 5 | ∞ | 1.85 | 1.59282 | 68.63 |
| 6 | −20.3552 | 0.10 | | |
| *7 | 12.5712 | 2.19 | 1.61881 | 63.85 |
| *8 | −20.0000 | DD[8] | | |
| 9 | −39.1238 | 0.56 | 1.88300 | 40.76 |
| 10 | 5.2008 | 0.63 | | |
| 11 | 23.1858 | 2.14 | 1.95906 | 17.47 |
| 12 | −7.6520 | 0.55 | 1.91082 | 35.25 |
| 13 | 11.0145 | 0.30 | | |
| *14 | 12.9406 | 0.95 | 1.82115 | 24.06 |
| *15 | 16.7581 | DD[15] | | |
| 16(STOP) | ∞ | 0.60 | | |
| *17 | 6.3483 | 3.00 | 1.51760 | 63.50 |
| *18 | −21.7173 | 1.00 | | |
| *19 | −42.9700 | 0.60 | 1.77250 | 49.47 |
| *20 | 23.9992 | DD[20] | | |
| 21 | 12.0178 | 2.17 | 1.49700 | 81.61 |
| 22 | −155.2588 | 0.71 | | |
| 23 | 7.8416 | 3.62 | 1.49700 | 81.61 |
| 24 | −10.0000 | 0.57 | 2.00100 | 29.13 |
| 25 | 13.5982 | 0.25 | | |
| *26 | 8.4999 | 2.20 | 1.50957 | 56.38 |
| *27 | −6.9184 | DD[27] | | |
| 28 | 2823.5427 | 0.55 | 1.88300 | 40.76 |
| 29 | 9.6231 | DD[29] | | |
| 30 | ∞ | 0.80 | 1.51680 | 64.20 |
| 31 | ∞ | 2.00 | | |

TABLE 22

EXAMPLE 6 • SPECIFICATION (d-LINE)

| | WIDE ANGLE | MIDDLE | TELEPHOTO |
|---|---|---|---|
| ZOOM RATIO | 1.0 | 2.3 | 4.7 |
| f | 4.04 | 9.22 | 19.03 |
| Bf | 6.21 | 10.09 | 12.51 |
| FNo. | 2.91 | 3.59 | 4.78 |
| 2ω [°] | 98.2 | 45.6 | 11.8 |
| STOP DIAMETERφ | 5.7 | 5.7 | 4.9 |

TABLE 23

EXAMPLE 6 • ZOOM DISTANCE

| | WIDE ANGLE | MIDDLE | TELEPHOTO |
|---|---|---|---|
| DD[8] | 0.30 | 3.73 | 6.29 |
| DD[15] | 7.07 | 3.63 | 1.07 |
| DD[20] | 7.63 | 3.72 | 1.66 |
| DD[27] | 1.66 | 1.67 | 1.31 |
| DD[29] | 3.68 | 7.56 | 9.99 |

TABLE 24

EXAMPLE 6 · ASPHERIC COEFFICIENT

| | SURFACE NUMBER | | | |
|---|---|---|---|---|
| | 7 | 8 | 14 | 15 |
| KA | 9.5658130E−01 | 8.6025509E+00 | −2.6108769E+01 | −2.4831672E+01 |
| A3 | −3.9762818E−04 | −5.6147466E−05 | 2.2752270E−03 | 1.5831924E−04 |
| A4 | 1.2006980E−04 | 6.2714059E−06 | −2.4693765E−03 | 7.2477531E−04 |
| A5 | −6.3309508E−05 | 7.8224258E−05 | 5.0343833E−03 | −1.0182387E−03 |
| A6 | 1.3743721E−05 | −1.4992367E−06 | −3.1306829E−03 | 5.5654150E−04 |
| A7 | 6.1765026E−07 | −6.4103380E−07 | 3.7045644E−04 | −3.2134602E−05 |
| A8 | −2.8589302E−07 | −2.2406519E−07 | 5.1447791E−04 | −1.2013409E−04 |
| A9 | −4.3942816E−08 | −3.6708383E−08 | −2.0260149E−04 | 5.3605836E−05 |
| A10 | −8.8105186E−10 | −5.4143170E−09 | −1.0821143E−05 | 4.1811043E−06 |
| A11 | 1.5022652E−09 | 4.6028179E−09 | 1.6803099E−05 | −7.3999227E−06 |
| A12 | 1.4948376E−10 | 1.1345828E−09 | −2.2260730E−06 | 1.2894494E−06 |
| A13 | −6.8171010E−12 | 9.6787308E−11 | | |
| A14 | 3.5801175E−12 | −5.0793741E−11 | | |
| A15 | −1.1155002E−12 | −2.6489407E−11 | | |
| A16 | 1.3620523E−13 | 4.8583801E−12 | | |

| | SURFACE NUMBER | | | |
|---|---|---|---|---|
| | 17 | 18 | 19 | 20 |
| KA | 5.2309491E−02 | 2.5628666E+01 | 2.7816757E+01 | −9.3735880E+00 |
| A3 | 5.3552829E−05 | −8.8906533E−04 | −2.7014682E−03 | −2.1102524E−03 |
| A4 | −9.7982097E−05 | 1.0206017E−03 | 8.4980307E−04 | 1.0149963E−03 |
| A5 | 4.0022513E−04 | 3.9939199E−04 | 8.9133122E−05 | −4.2598267E−04 |
| A6 | −6.7482967E−05 | 1.4703463E−05 | −6.2213741E−05 | 8.9181718E−05 |
| A7 | −1.7393811E−05 | −5.2912945E−05 | 7.4954910E−06 | 1.4728831E−05 |
| A8 | 2.1237549E−06 | 6.1173863E−07 | 3.9084248E−07 | −2.8450547E−08 |
| A9 | 1.6901442E−06 | 1.4776313E−06 | −1.0494148E−07 | −1.0526123E−06 |
| A10 | 3.8927426E−08 | 5.5941775E−07 | 2.0235325E−07 | −1.3258291E−07 |
| A11 | −4.1524993E−08 | 2.1684270E−07 | 2.3952238E−08 | −2.1009564E−08 |
| A12 | −2.4969837E−09 | −6.7995917E−08 | −1.2636594E−08 | 2.0299424E−08 |

| | SURFACE NUMBER | |
|---|---|---|
| | 26 | 27 |
| KA | 1.0195327E+00 | −6.0692501E−02 |
| A3 | 1.4488838E−03 | 2.0538646E−03 |
| A4 | −2.9868997E−03 | −2.3865561E−03 |
| A5 | 1.3861135E−03 | 1.7832989E−03 |
| A6 | −4.3359468E−04 | −4.6178848E−04 |
| A7 | −1.0360565E−05 | −1.6653177E−05 |
| A8 | 2.1284454E−05 | 1.6894844E−06 |
| A9 | 9.5320432E−06 | 7.4986991E−06 |
| A10 | −4.5237310E−06 | 3.0586778E−06 |
| A11 | 2.2688205E−07 | −2.1641708E−06 |
| A12 | 5.7861980E−08 | 2.8543119E−07 |

Table 25 shows values corresponding to conditional expressions (1) through (6) for the zoom lenses in Examples 1 through 6. In all of the examples, d-line is a reference wavelength. The following Table 25 shows values at this reference wavelength.

TABLE 25

| | EXAMPLE 1 | EXAMPLE 2 | EXAMPLE 3 | EXAMPLE 4 | EXAMPLE 5 | EXAMPLE 6 |
|---|---|---|---|---|---|---|
| (1) IH/fw | 0.838 | 1.003 | 0.840 | 0.844 | 1.006 | 0.990 |
| (2) φstw/Dstim | 0.216 | 0.194 | 0.216 | 0.217 | 0.194 | 0.185 |
| (3) ν4dp | 81.6 | 81.6 | 81.6 | 81.6 | 81.6 | 81.6 |
| (4) f4/fw | 1.797 | 2.458 | 1.809 | 1.814 | 2.433 | 2.474 |
| (5) νd4p−νd4n | 56.2 | 52.5 | 56.2 | 56.2 | 52.5 | 52.5 |
| (6) φstt/φstw | 0.870 | 0.849 | 0.877 | 0.825 | 0.863 | 0.860 |

As these data show, all of the zoom lenses in Examples 1 through 6 satisfy conditional expressions (1) through (6). It is recognizable that the zoom lenses have high zoom ratios and wide angles of view, and that they are fast lenses, and that various aberrations are excellently corrected.

Figure 14:
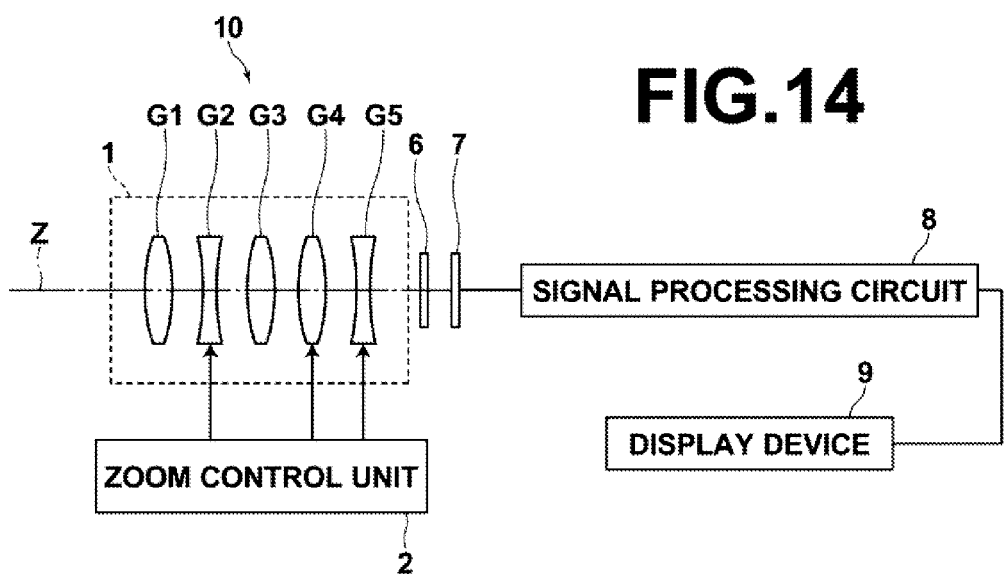
FIG. 14 is a schematic diagram illustrating the configuration of an imaging apparatus according to an embodiment of the present disclosure.

Next, an imaging apparatus according to an embodiment of the present disclosure will be described. FIG. 14 is a schematic diagram illustrating the configuration of an imaging apparatus using a zoom lens according to an embodiment of the present disclosure, as an example of an imaging apparatus according to an embodiment of the present disclosure. In FIG. 14, each lens group is schematically illustrated. This imaging apparatus is, for example, a video camera, an electronic still camera or the like using a solid-state imaging device, such as a CCD and a CMOS, as a recording medium.

An imaging apparatus 10 illustrated in FIG. 14 includes a zoom lens 1, a zoom control unit 2 that controls magnification change of the zoom lens 1, a filter 6 having a function of a low-pass filter or the like, and which is arranged toward the image side of the zoom lens 1, an imaging device 7 arranged toward the image side of the filter 6, and a signal processing circuit 8. The imaging device 7 converts an optical image formed by the zoom lens 1 into electrical signals. For example, a CCD (Charge Coupled Device), a CMOS (Complementary Metal Oxide Semiconductor) or the like may be used as the imaging device 7. The imaging device 7 is arranged in such a manner that an imaging surface of the imaging device 7 is matched with the image plane of the zoom lens 1.

An image imaged by the zoom lens 1 is formed on the imaging surface of the imaging device 7, and signals about the image are output from the imaging device 7. Operation processing is performed on the output signals at the signal processing circuit 8, and an image is displayed on a display device 9.

So far, the present disclosure has been described by using embodiments and examples. However, the present disclosure is not limited to the aforementioned embodiments nor examples, and various modifications are possible. For example, the values of a curvature radius, a distance between surfaces, a refractive index, an Abbe number and the like of each lens element are not limited to the values in the aforementioned numerical value examples, and may be other values.

What is claimed is:

1. A zoom lens consisting of, in order from the object side:
a first lens group having positive refractive power, and which is fixed during magnification change;
a second lens group having negative refractive power, and which moves during magnification change;
a third lens group having positive refractive power, and which is fixed during magnification change;
a fourth lens group having positive refractive power, and which moves during magnification change; and
a fifth lens group having negative refractive power, and which moves during magnification change,
wherein the first lens group consists of, in order from the object side, a front group having negative refractive power, a reflection member that bends an optical path and a rear group having positive refractive power, and
wherein the fourth lens group includes at least a cemented lens of a positive lens and a negative lens, and
wherein the following conditional expressions (1) and (5) are satisfied:

$$0.8 < IH/fw \quad (1); \text{ and}$$

$$vd4p - vd4n > 45 \quad (5), \text{ where}$$

IH is a maximum image height,
fw is a focal length at a wide angle end,
vd4p is an Abbe number of the positive lens constituting the cemented lens in the fourth lens group, and
vd4n is an Abbe number of the negative lens constituting the cemented lens in the fourth lens group.

2. The zoom lens, as defined in claim 1, wherein the third lens group includes a stop, and wherein the following conditional expression (2) is satisfied:

$$0.18 < \phi stw/Dstim < 0.25 \quad (2), \text{ where}$$

$\phi stw$ is an aperture stop diameter at a wide angle end, and Dstim is a distance from a stop to an image plane.

3. The zoom lens, as defined in claim 1, wherein the following conditional expression (3) is satisfied:

$$vd4p > 75.0 \quad (3), \text{ where}$$

vd4p is an Abbe number of the positive lens constituting the cemented lens in the fourth lens group.

4. The zoom lens, as defined in claim 1, wherein the following conditional expression (4) is satisfied:

$$1.5 < f4/fw < 3.0 \quad (4), \text{ where}$$

f4 is a focal length of the fourth lens group.

5. The zoom lens, as defined in claim 1, wherein the second lens group includes, in order from the object side, a negative lens, a positive lens and a negative lens, and consists of four lenses as a whole.

6. The zoom lens, as defined in claim 1, wherein the third lens group includes, in order from the object side, a positive lens and a negative lens.

7. The zoom lens, as defined in claim 1, wherein the following conditional expression (6) is satisfied:

$$\phi stt/\phi stw < 1 \quad (6), \text{ where}$$

$\phi stt$ is an aperture stop diameter at a telephoto end, and $\phi stw$ is an aperture stop diameter at a wide angle end.

8. The zoom lens, as defined in claim 1, wherein the following conditional expression (1-1) is satisfied:

$$0.8 < IH/fw < 1.1 \quad (1\text{-}1).$$

9. The zoom lens, as defined in claim 1, wherein the following conditional expression (1-2) is satisfied:

$$0.9 < IH/fw < 1.1 \quad (1\text{-}2).$$

10. The zoom lens, as defined in claim 1, wherein the third lens group includes a stop, and
wherein the following conditional expression (2-1) is satisfied:

$$0.18 < \phi stw/Dstim < 0.23 \quad (2\text{-}1), \text{ where}$$

$\phi stw$ is an aperture stop diameter at a wide angle end, and Dstim is a distance from a stop to an image plane.

11. The zoom lens, as defined in claim 1, wherein the following conditional expression (3-1) is satisfied:

$$vd4p > 80.0 \quad (3\text{-}1), \text{ where}$$

vd4p is an Abbe number of the positive lens constituting the cemented lens in the fourth lens group.

12. The zoom lens, as defined in claim 1, wherein the following conditional expression (4-1) is satisfied:

$$1.7 < f4/fw < 2.5 \quad (4\text{-}1), \text{ where}$$

f4 is a focal length of the fourth lens group.

13. The zoom lens, as defined in claim 1, wherein the following conditional expression (5-1) is satisfied:

$$vd4p - vd4n > 50 \quad (5\text{-}1), \text{ where}$$

vd4p is an Abbe number of the positive lens constituting the cemented lens in the fourth lens group, and
vd4p is an Abbe number of the negative lens constituting the cemented lens in the fourth lens group.

14. An imaging apparatus comprising:
the imaging lens, as defined in claim 1.

* * * * *